United States Patent
Abhishek et al.

(10) Patent No.: US 10,339,585 B2
(45) Date of Patent: Jul. 2, 2019

(54) COMBINED BOOTSTRAP DISTRIBUTION AND MIXTURE SEQUENTIAL PROBABILITY RATIO TEST APPLICATIONS TO ONLINE ECOMMERCE WEBSITES

(71) Applicant: WAL-MART STORES, INC., Bentonville, AR (US)

(72) Inventors: Vineet Abhishek, Mountain View, CA (US); Shie Mannor, Haifa (IL)

(73) Assignee: WALMART APOLLO, LLC, Bentonville, AR (US)

(*) Notice: Subject to any disclaimer, the term of this patent is extended or adjusted under 35 U.S.C. 154(b) by 279 days.

(21) Appl. No.: 15/287,421

(22) Filed: Oct. 6, 2016

(65) Prior Publication Data
US 2018/0101885 A1    Apr. 12, 2018

(51) Int. Cl.
*G06Q 30/06* (2012.01)
*G06F 16/9535* (2019.01)

(52) U.S. Cl.
CPC ..... *G06Q 30/0627* (2013.01); *G06F 16/9535* (2019.01)

(58) Field of Classification Search
CPC .......... G06F 17/30648; G06Q 30/0627; G06Q 30/06–30/08
USPC ................................................ 705/26.1–27.2
See application file for complete search history.

(56) References Cited

U.S. PATENT DOCUMENTS 7,426,497 B2 * 9/2008 Bacioiu ................ G06K 9/6262
706/12
9,245,334 B2 * 1/2016 Lipton .................. G06T 7/0012
2015/0206244 A1 * 7/2015 Fulci ..................... G06Q 40/06
705/36 R

OTHER PUBLICATIONS

"Controlled Experiments for Decision-Making in e-Commerce Search," Goswami et al. 2015 IEEE International Conference on Big Data.*
A Nonparametric Sequential Test for Online Randomized Experiments, Vineet Abhishek Jul. 17, 2004, 2017 International World Wide Web Conference Committee.*
"Bootstrap approach control limit for statistical quality control," International Journal of Engineering Science Invention, Apr. 2013 pp. 28-33.*
"Bias correction and confidence intervals following sequential tests," Tze Leung Lai, Zheng Su, and Chin Shan Chuang, 2006, Stanford University and Millennium Partners.*

(Continued)

*Primary Examiner* — Ming Shui
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of receiving an online search query entered into a search field of an online ecommerce website by a user using the online ecommerce website, determining a query response to the online search query by combining a nonparametric bootstrap distribution and a mixture sequential probability ratio test, the query response comprising one or more products, and coordinating a display of the query response to the user using the online ecommerce website. The query response can be based on one of a query success rate per user session of a plurality of previous user sessions or a revenue per user session of the plurality of previous user sessions.

20 Claims, 8 Drawing Sheets

(56) References Cited

OTHER PUBLICATIONS

"Classifying Time Series Data: A Nonparametric Approach," Vilar, Juan Manuel, 2009.*

Johari, R., Pekelis, L., and Walsh, D.J., Always Valid Inference: Bringing Sequential Analysis to A/B Testing Feb. 17, 2016 (32 pages).

* cited by examiner

415

416 – Dividing data from the plurality of previous user sessions into a plurality of blocks of data.

417 – Determining studentized plug-in statistics for the revenue per user session of the plurality of previous user sessions on each block of data of the plurality of blocks of data.

418 – Estimating a revenue likelihood ratio of the studentized plug-in statistics for each block of data of the plurality of blocks of data using the nonparametric bootstrap distribution.

419 – Performing the mixture SPRT using the revenue likelihood ratio of the studentized plug-in statistics for each block of data of the plurality of blocks of data.

FIG. 4C

COMBINED BOOTSTRAP DISTRIBUTION AND MIXTURE SEQUENTIAL PROBABILITY RATIO TEST APPLICATIONS TO ONLINE ECOMMERCE WEBSITES

TECHNICAL FIELD

This disclosure relates generally to ecommerce applications of combined bootstrap distributions and mixture sequential probability ratio tests.

BACKGROUND

Many major online ecommerce websites continuously run several randomized experiments to measure the performance of new features or algorithms, and also to determine the success or failure of those new features or algorithms. A typical workflow for measuring the performance of new features or algorithms and to determine their success or failure can include: (i) defining a success metric; and (ii) performing a statistical hypothesis test to determine whether or not the change in the success metric is significant. Both of these steps, however, are nontrivial in practice. Many commonly used families of probability distributions such as the Bernoulli or the normal distribution are almost never suitable to model complex data associated with new features or algorithms of online ecommerce websites. Moreover, the use of a normal distribution can be inaccurate and sensitive to extreme values. As a result, the use of the t-test or the binomial proportion test for hypothesis testing is unsuitable for some metrics pertaining to online ecommerce websites.

BRIEF DESCRIPTION OF THE DRAWINGS

To facilitate further description of the embodiments, the following drawings are provided in which:

FIGS. 4A-C are flowcharts for a method, according to certain embodiments;

Figure 1:
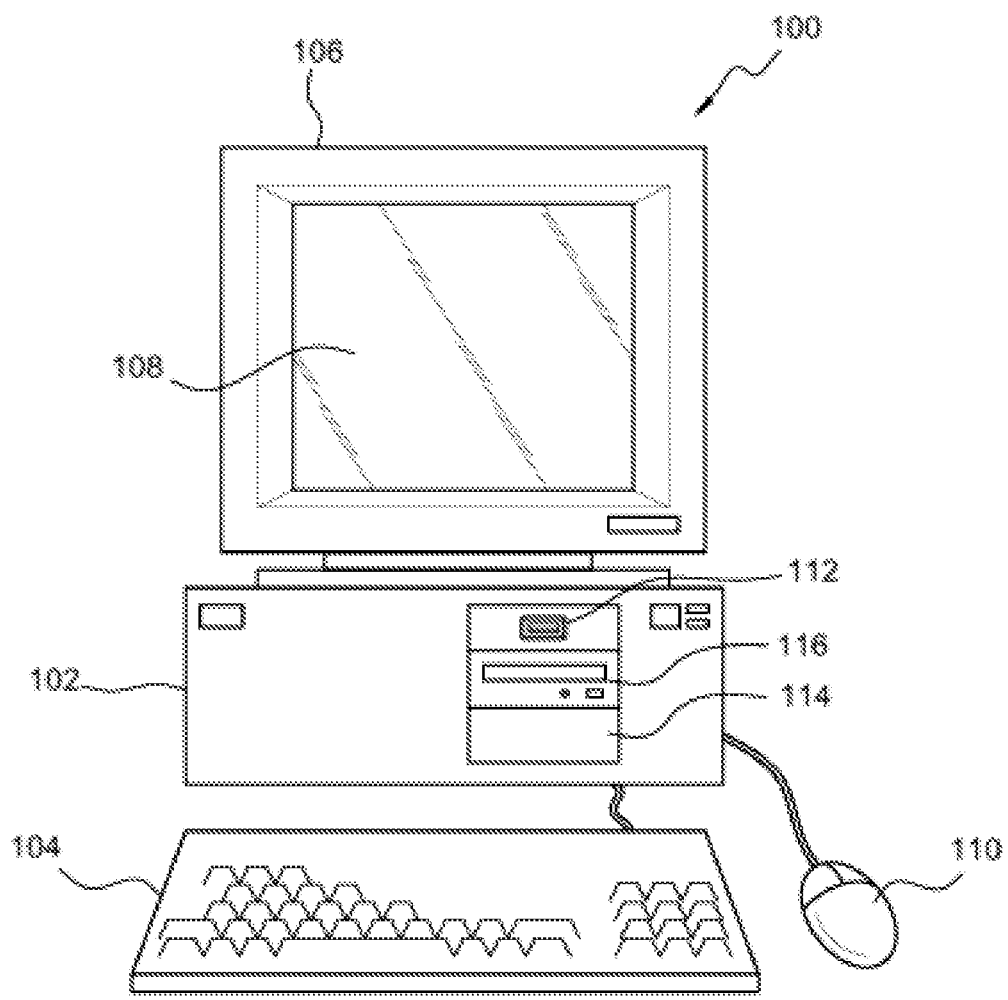
FIG. 1 illustrates a front elevational view of a computer system that is suitable for implementing various embodiments of the systems disclosed in FIGS. 3 and 6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform the act of receiving an online search query entered into a search field of an online ecommerce website by a user using the online ecommerce website. The one or more storage modules can also be configured to run on the one or more processing modules and perform the act of determining a query response to the online search query by combining a nonparametric bootstrap distribution and a mixture sequential probability ratio test (SPRT), the query response comprising one or more products and being based on one of: (1) a first metric comprising a query success rate per user session of a plurality of previous user sessions, or (2) a second metric comprising a revenue per user session of the plurality of previous user sessions, wherein the first metric comprises a ratio of a total number of successful queries per user session of the plurality of previous user sessions to a total number of queries per user session of the plurality of previous user sessions. The one or more storage modules can also be configured to run on the one or more processing modules and perform the act of coordinating a display of the query response to the user using the online ecommerce website.

Various embodiments include a method. The method can include receiving an online search query entered into a search field of an online ecommerce web site by a user using the online ecommerce web site; determining a query response to the online search query with a combination of a nonparametric bootstrap distribution and a mixture sequential probability ratio test (SPRT), the query response comprising one or more products and being based on one of: (1) a first metric comprising a query success rate per user session of a plurality of previous user sessions, or (2) a second metric comprising a revenue per user session of the plurality of previous user sessions, wherein the first metric comprises a ratio of a total number of successful queries per user session of the plurality of previous user sessions to a total number of queries per user session of the plurality of previous user sessions; and coordinating a display of the query response to the user using the online ecommerce website.

A number of embodiments can include a system. The system can include one or more processing modules and one or more non-transitory storage modules storing computing instructions configured to run on the one or more processing modules. The one or more storage modules can be configured to run on the one or more processing modules and perform the act of preventing type 1 error inflation under continuous monitoring of a parameter of interest by: dividing data from the parameter of interest into a plurality of blocks of data; determining studentized plug-in statistics for the parameter of interest on each block of data of the plurality of blocks of data; estimating a parameter of interest likelihood ratio of the studentized plug-in statistics for each block of data of the plurality of blocks of data using a nonparametric bootstrap distribution; and performing a mixture sequential probability ratio test (SPRT) using the parameter of interest likelihood ratio of the studentized plug-in statistics for each block of data of the plurality of blocks of data by treating each block of data of the plurality of blocks of data as a unit observation.

Various embodiments include a method. The method can include preventing type 1 error inflation under continuous monitoring of a parameter of interest by: dividing data from the parameter of interest into a plurality of blocks of data; determining studentized plug-in statistics for the parameter of interest on each block of data of the plurality of blocks of data; estimating a parameter of interest likelihood ratio of the studentized plug-in statistics for each block of data of the plurality of blocks of data using a nonparametric bootstrap distribution; and performing a mixture sequential probability ratio test (SPRT) using the parameter of interest likelihood ratio of the studentized plug-in statistics for each block of data of the plurality of blocks of data by treating each block of data of the plurality of blocks of data as a unit observation.

Various embodiments can include a nonparametric sequential test aimed to address two practical problems pertinent to online randomized experiments utilized with ecommerce websites: (i) how to do a hypothesis test for complex metrics; and (ii) how to prevent type 1 error inflation under continuous monitoring. The nonparametric sequential test does not require knowledge of the underlying probability distribution generating the data. A bootstrapping statistical technique can be used to estimate a likelihood for blocks of data, followed by mixture sequential probability ratio test. This procedure can be validated with data from a major online ecommerce website as will be shown hereafter. The nonparametric sequential test can control type 1 error at any time, can have good power, and can allow quick inference in online randomized experiments.

Figure 2:
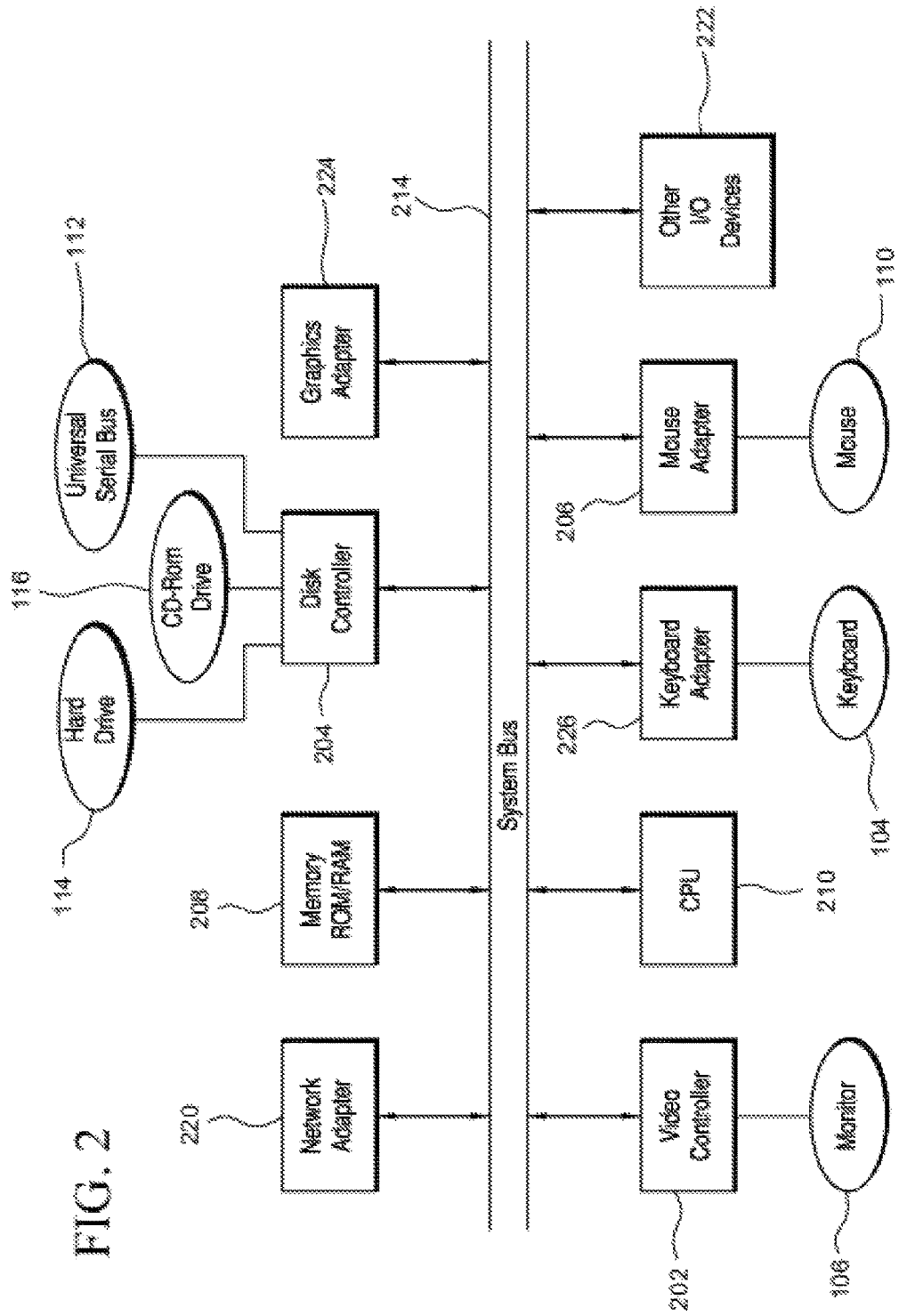
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
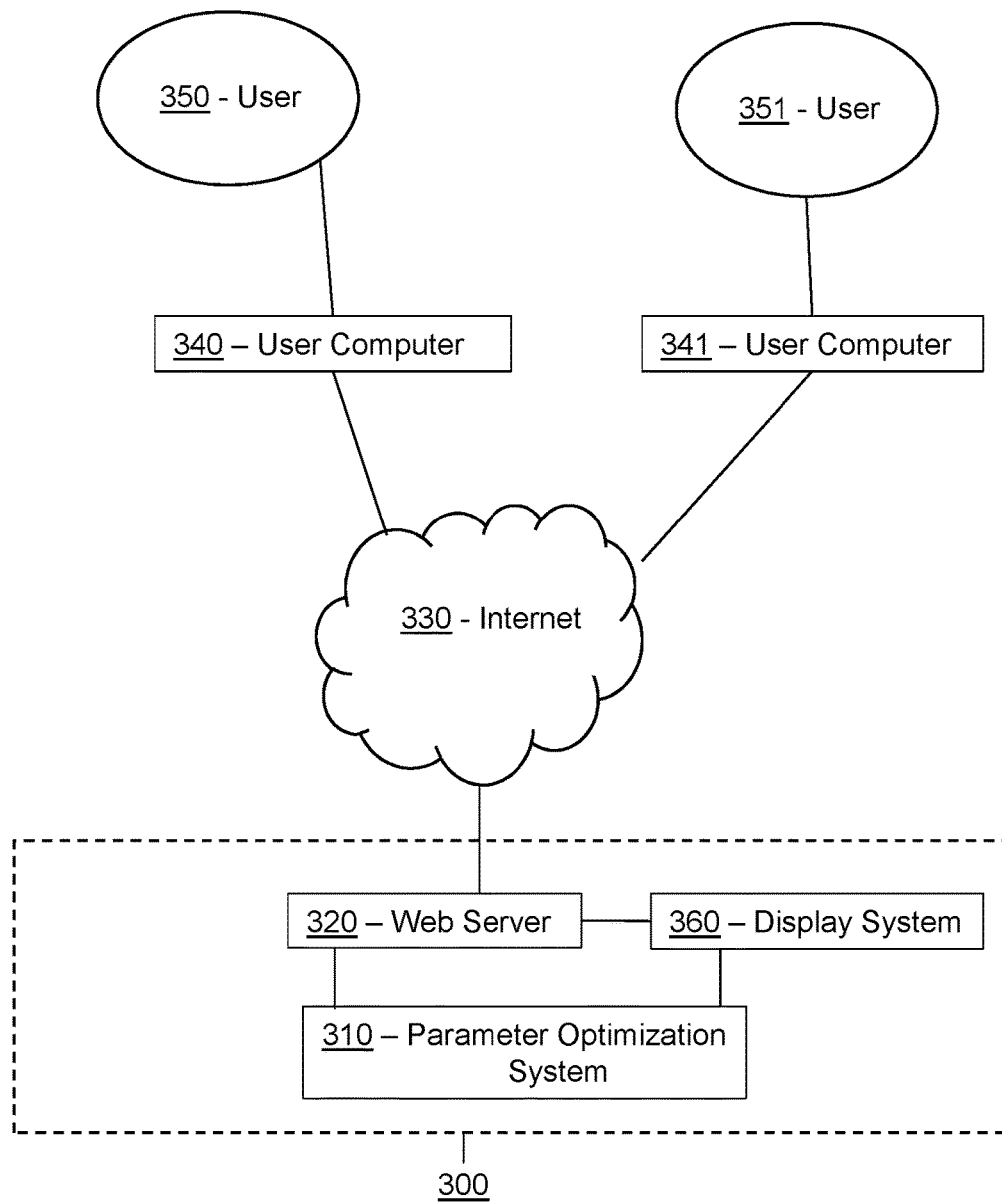
FIG. 3 illustrates a representative block diagram of a system, according to an embodiment.

Turning ahead in the drawings, FIG. 3 illustrates a block diagram of a system 300 that can be employed for utilization of a combination of a bootstrap distribution and a mixture sequential probability ratio test (SPRT) to various online ecommerce and computed-related application described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a parameter optimization system 310, a web server 320, and/or a display system 360. Parameter optimization system 310, web server 320, and display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of parameter optimization system 310, web server 320, and display system 360. Additional details regarding parameter optimization system 310, web server 320, and display system 360 are described herein.

In many embodiments, system 300 also can comprise user computers 340, 341. In some embodiments, user computers 340, 341 can be electronic mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, parameter optimization system 310, web server 320, and display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) parameter optimization system 310, web server 320, and display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of parameter optimization system 310, web server 320, and display system 360. In a similar manner, the processing module(s) and the memory storage module(s) can be local and/or remote to each other.

In many embodiments, parameter optimization system 310, web server 320, and display system 360 can be configured to communicate with one or more customer computers 340 and 341. In some embodiments, customer computers 340 and 341 also can be referred to as user computers. In some embodiments, parameter optimization system 310, web server 320, and display system 360 can communicate or interface (e.g. interact) with one or more customer computers (such as customer computers 340 and 341) through a network or internet 330. Internet 330 can be an intranet that is not open to the public. Accordingly, in many embodiments, parameter optimization system 310, web server 320, and display system 360 (and/or the software used by such systems) can refer to a back end of system 300 operated by an operator and/or administrator of system 300, and customer computers 340 and 341 (and/or the software used by such systems) can refer to a front end of system 300 used by one or more customers 350 and 351, respectively. In some embodiments, customers 350 and 351 also can be referred to as users. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, parameter optimization system 310, web server 320, and display system 360 also can be configured to communicate with one or more databases. The one or more databases can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between parameter optimization system 310, web server 320, and display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Some major online websites continuously run several randomized experiments to measure the performance of new features or formulas and to determine their success or failure. A typical workflow consists of: (i) defining a success metric; and (ii) performing a statistical hypothesis test to determine whether or not the change in the success metric is significant. Both of these steps, however, are nontrivial in practice. For example, typical product search performance data collected by an online ecommerce website can be multidimensional, containing dimensions such as number of search queries, number of conversions, time to first click, total revenue from sale, etc., for each user session. The success metric of interest can be a complicated scalar function of this multidimensional data rather than some simple average; e.g., a metric of interest could be a ratio of expected number of successful queries per user session to an expected number of total queries per user session, the empirical estimate of which is a ratio of two sums. Furthermore, some commonly used families of probability distributions such as the Bernoulli or the normal distribution are almost never suitable to model this data. The search queries in a user session are highly correlated, and using the Bernoulli distribution to model even simple metrics such a click-through rate per impression is inaccurate. Another example is the revenue based metrics with considerable mass at zero and a heavy tail distribution for the rest. The use of normal distribution for modeling revenue per user session is inaccurate and sensitive to extreme values, unless the sample size is large. As a result, the use of the t-test or the binomial proportion test for hypothesis testing is unsuitable for such metrics. It requires considerable effort to find appropriate models for each of these metrics and it is implausible to come up with a suitable parametrized family of probability distributions that could be used to model different complex success metrics.

Additionally, classical statistical tests such as the t-test assume that the number of samples are given priori. This assumption breaks in an online setting where an end user with not much formal training in statistics has substantially real-time access of the performance of ongoing randomized experiments. The decision to stop or continue collecting more data is often based on whether or not the statistical test on the data collected so far shows significance or not. This practice of chasing significance leads to highly inflated type 1 error. The inflation of type 1 error can be explained by the law of the iterated logarithm. Use of a sample size calculator to determine the number of samples to be collected and waiting until the required number of samples have been collected can be difficult to enforce in practice, especially in a do-it-yourself type platforms commonly used to set up and monitor online randomized experiments. Additionally, the sample size calculation requires an estimate of the minimum effect size and the variance of the metric. These estimates are often crude and result in waiting longer than necessary in case the true change is much larger than the estimate.

According to this disclosure, two separate fields of statistics can be utilized together to solve these problems: the bootstrap distribution and sequential tests. A bootstrap distribution can be used to estimate the properties of complicated statistics. Sequential tests provide an alternative to committing to a fixed sample size by providing type 1 error control at any time under continuous monitoring. Sequential tests are uncommon in practice, partly because of the information they require about the data generation process.

Various embodiments bring together aspects of the bootstrap and sequential tests, and apply them together to construct a nonparametric sequential test for performing hypothesis test on complex metrics. In one non-limiting embodiment, data from a major online ecommerce website can be used to demonstrate that a nonparametric sequential test is: suitable for diverse type of metrics, ensures that type 1 error is controlled at any time under continuous monitoring, has good power, and enables making quick inference in online randomized experiments. This generally can be used in the absence of knowledge of the right distribution generating the data. Using a revenue metric with a nonparametric sequential test as described herein can have a higher power than the z-test.

In some embodiments, studentized statistics are determined for a metric of interest on blocks of data and a bootstrapping technique is used to estimate likelihood of the metric of interest in a nonparametric manner. The likelihood ratios can then be used to perform a SPRT. Metrics of interests can include but are not limited to: website presentations; responses to search queries; identification of modules in a software system or mobile application that are working or not working as desired; determination of a need to exchange a module in a software system or mobile application; determination of properties of a user; and/or testing of software.

The bootstrap-based nonparametric approach utilized in this disclosure is advantageous to conventional sequential testing. Conventional sequential testing assumes the knowledge of a parametrized family of distribution from which data, typically scalar, is generated. In some embodiments, the bootstrap-based nonparametric approach utilized in this disclosure does not assume the knowledge of a parametrized family of distribution from which data, typically scalar, is generated.

In some embodiments, one or more of the following models, notations, and assumptions are utilized. $X \in \mathbb{R}^d$ can be a random vector with a cumulative distribution function (CDF) $F(x; \theta, \eta)$ and corresponding probability density function (pdf) $f(x; \theta, \eta)$. Here $\theta$ is the scalar parameter of interest and is a nuisance parameter (possibly empty or multidimensional). A realized value of the random vector X by x can be denoted. For $j<k$, let $X_{j:k} \triangleq (X_j, X_{j+1}, \ldots, X_k)$ be a collection of independent and identically distributed (i.i.d.) random vectors indexed from j to k; and define $x_{j:k}$ similarly.

Testing the null hypothesis $\theta = \theta_0$ against the alternate hypothesis $\theta \neq \theta_0$ can be performed such that the type 1 error is controlled at any given time and the power of the test should be high; i.e., seeking a function $D_{\theta_0}$ mapping sample paths $x_1, x_2, \ldots$ to $[0, 1]$ such that for any $\alpha \in (0,1)$ Formula 1 is:

$$\mathbb{P}_\theta[D_{\theta_0}(X_{1:n}) \leq \alpha \text{ for some } n \geq 1] \begin{cases} \leq \alpha, & \text{if } \theta = \theta_0, \\ \approx 1, & \text{if } \theta \neq \theta_0 \end{cases},$$

where X's are assumed to be realized i.i.d. from $F(x; \theta, \eta)$ and $\mathbb{P}_\theta$ is the probability under $F(x; \theta, \eta)$.

In some embodiments, $\hat{F}(x_{1:n})$ can be the empirical cumulative distribution function (CDF) constructed from n i.i.d. samples. The following assumption can be made about the parameter of interest $\theta$:

Assumption 1.

Assume that $\theta$ is a functional statistic with asymptotically normal distribution, i.e., $\theta = T(F)$ for some functional T and $\sqrt{n}(T(\hat{F}(X_{1:n})) - \theta) \to \mathcal{N}(0, \zeta^2)$ in distribution as $n \to \infty$, where $T(\hat{F}(x_{1:n}))$ is the plug-in estimate of θ. Furthermore, assume that the asymptotic variance $\zeta^2$ does not depend on the specific choice of θ. Asymptotic normality of plug-in statistics in Assumption 1 holds under fairly general conditions and captures several statistics of interest.

In some embodiments, aspects of bootstrap distribution and the mixture SPRT can be utilized. According to various embodiments, a bootstrap distribution can be described in the following terms: let $Z_{1:n}$ be n i.i.d. random variables and let $H_n(z) \triangleq \mathbb{P}[T(Z_{1:n}) \leq z]$ be the sampling distribution of a functional T. The CDF of Z's is usually unknown and hence $H_n$ cannot be computed directly. The (nonparametric) bootstrap is used to approximate the sampling distribution $H_n$ using a resampling technique. Let $Z^*_{1:n}$ be n i.i.d random variables each with the CDF equal to the empirical CDF constructed from $Z^*_{1:n}$. Let $H^*_n(z) \triangleq \mathbb{P}[T(Z^*_{1:n}) \leq z | Z_{1:n}]$ be the bootstrap distribution of the functional T. Notice that $H^*_n$ is a random CDF that depends on the realized values of $Z_{1:n}$. The idea is to use $H^*_n$ as an approximation for $H_n$. Under some regularity conditions and a suitable distance metric on the space of CDFs, distance between $H_n$ and $H^*_n$ goes to zero with probability 1 as n→∞.

The bootstrap distribution is computed using the Monte Carlo method by drawing a large number of samples, each of size n, from the empirical distribution, which is identical to sampling with replacement. This provides a convenient computational method to deal with complex statistics. Even in the cases where the statistics is asymptotically normal, the bootstrap can be relied upon to compute an asymptotic variance. Moreover, for asymptotically normal statistics, the bootstrap typically provides an order improvement in convergence rate to the true distribution. This motivates the use of the bootstrap in our nonparametric sequential test.

According to various embodiments, in a general form, mixture SRPT works as follows: let $\rho_n(Z_{1:n}; \theta)$ be the joint pdf parametrized by θ for a sequence of random variables $Z_{1:n}$. Let $\theta \in I$ and $\pi(\theta)$ any prior on θ with $\pi(\theta) > 0$ for $\theta \in I$. Formula 2 defines:

$$L(z_{1:n}; \theta_0) \triangleq \frac{\int_{\theta \in I} \rho_n(z_{1:n}; \theta) \pi(\theta)}{\rho_n(z_{1:n}; \theta_0)}$$

If $\theta=\theta_0$, the sequence $L(Z_{1:n}; \theta_0)$ forms a martingale with respect to the filtration induced by the sequence $Z_n$. This follows from a general observation that if and $Z_{1:n} \sim \rho_n(z_{1:n})$ and $\psi_n(z_{1:n})$ is any other probability density function, then $L_n = \psi_n(z_{1:n})/\rho_n(z_{1:n})$ is a martingale. Using Doob's martingale inequality, Formula 3 is:

$$\mathbb{P}_{\theta_0} = \left[L(Z_{1:n}; \theta_0) > \frac{1}{\alpha} \text{ for some } n \geq 1\right] \leq \alpha \text{ for any } \alpha > 0,$$

where the probability is computed assuming $\theta=\theta_0$. An immediate consequence of this is control of type 1 error at any time. The optimality of mixture SPRT with respect of power, the expected time to stop, and the ease of implementation motivates its use in our nonparametric sequential test.

The p-value at time n is defined, in Formula 4, as:

$$pvalue(z_{1:n}; \theta_0) \triangleq \min\left\{1, \frac{1}{\max\{L(z_{1:t}; \theta_0): t \leq n\}}\right\}.$$

It follows immediate from Formula 3 and Formula 4 that $\mathbb{P}_{\theta_0}[pvalue(Z_{1:n}; \theta_0) \leq \alpha] \leq \alpha$ for any n and $pvalue(z_{1:n}; \theta_0)$ is non-increasing in n. In this sense, this is an always valid p-value sequence. The duality between the p-value and the confidence interval can be used to construct an always valid (though larger than the exact) confidence interval.

Mixture SPRT, however, requires the knowledge of the functional form of the pdf up to the unknown parameter of interest. This can be difficult, especially in a multidimensional setting and in the presence of nuisance parameter(s). To address this difficulty, use of the bootstrap distribution is contemplated.

In some embodiments, a mixture SPRT and a bootstrap distribution can be used together to construct a nonparametric sequential test for complex statistics. A mixture SPRT and a bootstrap distribution can also be applied to A/B tests, as shall be shown in greater detail below.

In some embodiments, a combined bootstrap distribution mixture SPRT comprises: (i) dividing data into blocks of size N; (ii) computing studentized plug-in statistics for each block of data, and for B bootstrap samples (such as sampling with replacement) on each block of data; (iii) estimating a likelihood of the studentized plug-in statistics for each block using the bootstrap; (iv) using mixture SPRT by treating each block as a unit observation.

More particularly, in some embodiments, let $x_{(k)} \triangleq x_{kN:(k+1)N-1}$ denote the $k^{th}$ block of data of size N and $s(x_{(k)}; \theta)$ be the studentized plug-in statistics computed from the $k^{th}$ data block, also written as Formula 5:

$$s(x^k; \theta) = \frac{T(\hat{F}(x_{(k)})) - \theta}{\sigma(T(\hat{F}(x_{(k)})))},$$

where $\sigma(T(\hat{F}(x_{(k)})))$ is a consistent estimate of the standard deviation of the plug-in statistics $T(\hat{F}(x_{(k)}))$ (formally, $\sqrt{n}\sigma(T(\hat{F}(X_{1:n}))) \to \zeta$ with probability 1 as n→∞, where ζ defined in Assumption 1). For notational convenience, $\hat{\theta}_{(k)}$ and $s_{(k)}^\theta$ can be used in lieu of $T(\hat{F}(x_{(k)}))$ and $s(x_{(k)}; \theta)$, respectively, with the dependence on underlying x's and N being implicit, and their uppercase versions denoting the corresponding random variables. The random variable $S_{(k)}^\theta$ is asymptotically distributed as $\mathcal{N}(0,1)$ at rate $O(1/\sqrt{N})$ assuming θ is the true parameter. Hence, for large N, the distribution of $S_{(k)}^\theta$ can be almost pivotal (i.e., the distribution does not depend on the unknown θ and the (effect of η is negligible). This suggests using the normal density as the pdf for $S_{(k)}^\theta$ and carrying out mixture SPRT following the steps described above. The density, however, can be approximated better using the bootstrap.

Formula 1 describes a combination bootstrap mixture SPRT according to some embodiments. As used in Formula 1: θ is a scalar parameter of interest; $\theta_0$ is a baseline value for θ, and a hypothesis test can be carried out to determine if there is strong evidence to reject a null hypothesis $\theta=\theta_0$; $\pi(\theta)$ is a probability distribution representing prior knowledge about how likely various values of the parameter of interest θ are; M is the total number of i.i.d. samples drawn from the prior probability $\pi(\theta)$, and can be used for Monte Carlo computation of a Bayesian average; m is an index value for different samples drawn from the prior probability $\pi(\theta)$; $\tilde{\theta}_m$ is a $m^{th}$ sample drawn from the prior probability $\pi(\theta)$; N is a size of each block of data; k is an index value for different blocks of data; $x_{(k)}$ is $k^{th}$ block of data of size N; $\hat{\theta}_{(k)}$ is a plug-in estimate of the parameter of interest θ computed from the $k^{th}$ block of data $x_{(k)}$; $\sigma(\hat{\theta}_{(k)})$ is a standard deviation of the plug-in estimate $\hat{\theta}_{(k)}$ computed from the $k^{th}$ block of data $x_{(k)}$; B is a total number of bootstrap samples (such as sampling with replacement) on each block of data; b is an index value for different bootstrap samples; $x^*_{(k)}{}^b$ is a $b^{th}$ bootstrap sample of size N obtained by sampling with replacement on the $k^{th}$ block of data $x_{(k)}$; $s^*_{(k)}{}^b$ is the studentized plug-in statistics computed from $x^*_{(k)}{}^b$ using Formula 6; $g^*_{(k)}(\cdot)$ is the pdf obtained using a Gaussian kernel density estimate from the sequence $s^*_{(k)}{}^b$, $1 \le b \le B$; $L_n$ is a likelihood ratio score computed on n blocks of data using Formula 7; and $\alpha$ is a type 1 error threshold, for example, acceptance of incorrectly rejecting the null hypothesis $\theta = \theta_0$ at most a fraction of times in repeated experiments.

In Formula 1, given blocks of observations $x_{(k)}$ for k=1, 2, ..., and a prior $\pi(\theta)$:
1. Draw $\hat{\theta}_1, \hat{\theta}_2, \ldots \hat{\theta}_M$ i.i.d. from $\pi(\theta)$ for some large M.
2. For each k:
   (a) Compute $\hat{\theta}_{(k)}$ and its standard deviation $\sigma(\hat{\theta}_{(k)})$.
   (b) Draw a random sample of size N with replacement from $x_{(k)}$; denote it by $x^*_{(k)}$ Repeat this B times to obtain a sequence $x^*_{(k)}{}^b$, $1 \le b \le B$. For each b, compute the studentized plug-in statistics $s^*_{(k)}{}^b$ as Formula 6:

$$s^{*b}_{(k)} = \frac{T(\hat{F}(x^{*b}_{(k)})) - \hat{\theta}_{(k)}}{\sigma(T(\hat{F}(x^{*b}_{(k)})))}$$

Let $g^*_{(k)}(\cdot)$ be the pdf obtained using a Gaussian kernel density estimate form the sequence $s^*_{(k)}{}^b$, $1 \le b \le B$.
3. Compute $L_n$, as follows in Formula 7:

$$L_n = \sum_{m=1}^{M} \left( \frac{\prod_{k=1}^{n} g^*_{(k)}\left(\frac{\hat{\theta}_{(k)} - \tilde{\theta}_m}{\sigma(\hat{\theta}_{(k)})}\right)}{\prod_{k=1}^{n} g^*_{(k)}\left(\frac{\hat{\theta}_{(k)} - \tilde{\theta}_o}{\sigma(\hat{\theta}_{(k)})}\right)} \right)$$

4. Reject the null hypothesis $\theta = \theta_0$ if $L_n > 1/\alpha$ for some n>1.

Correctness of Formula 1 can be explained with a heuristic explanation. $L_n$ in step 3 is similar to Formula 2. If $L_n$ is approximately a martingale for $\theta = \theta_0$, arguments above would imply type 1 error control at any time under continuous monitoring. Step 2 of Formula 1 is approximating the true pdf of the random variable $S_{(k)}{}^\theta$, denoted by $g_{(k)}{}^\theta$, using the bootstrap based estimate $g^*_{(k)}$. It is only needed to ensure that $g^*_{(k)}$ is a good approximation of $g_{(k)}{}^{\theta_o}$, assuming $\theta = \theta_0$, for the martingale property to hold. A subtlety arises because the bootstrap distribution is discrete. This, however, is not a problem: a smoothened version of bootstrap density can be obtained by adding a small independent noise $N(0, (1/N^c)$ with arbitrary large c to the bootstrap samples converges uniformly to the true density at rate $O_p(1/N)$. Working with studentized statistics can be crucial in obtaining $O_p(1/N)$ convergence. By contrast, approximating $g_{(k)}$ by the normal density is accurate to $O(1/\sqrt{N})$. The bootstrap samples behave as if realized from a true density. Kernel density can be used to estimate the bootstrap density from finite number of bootstrap samples, as in step 2 of Formula 1. Step 4 is a Monte Carlo computation of Bayesian average in the right side of Formula 2.

Type 1 error control holds for any prior $\pi(\theta)$ with nonzero density on possible values of $\theta$. The choice of a prior $\pi(\theta)$, however, can affect the number of observations needed to reject the null hypothesis. A simple choice is $\mathcal{N}(0, \tau^2)$ with $\tau$ set to a few percent of the value of the metric of interest. This can be computed from the online data collected before the start time of the dataset under consideration. The standard deviation in Formula 6 for each b can be computed using the bootstrap again on $x^*_{(k)}{}^b$. This, however, is computationally prohibitive. In practice, the standard deviation can be computed using the delta method or the jackknife. A similar method can be used to compute the standard deviation in Formula 5. Typical choices for the number of bootstrap sample B can be but is not limited 2,000 to 5,000, and the number of Monte Carlo samples M from the prior can be but is not limited to 5,000 to 10,000. Because a block of data is used at a time, the computational overhead is minimal, and computation can be performed in an online manner as new blocks of data arrive or using a MapReduce approach on the historical data. Finally, small block size is intuitively expected to enable fast inference. Doob's martingale inequality is far from being tight for martingales stopped at some maximum length and becomes tighter as this maximum length is increased. However, small block size reduces the accuracy of the bootstrap likelihood estimate. Estimating a reasonable block size using post A/A tests is described in greater detail below.

In some embodiments, Formula 1 can be applied to A/B tests. In A/B tests, the goal is to identify whether or not the success metric computed on each of the two groups of data have nonzero difference (i.e., $\theta = \theta_0$). Bootstrap mixture SPRT can easily extends to A/B tests. Assume for simplicity that the block size is the same for both groups. Let $x_{(k)}$'s be data from group A (control), $y_{(k)}$'s be the data from group B (variation), $\hat{F}(x^*_{(k)}{}^b)$ be the empirical cumulative distribution function obtained from $x_{(k)}$ to assign a probability of 1/N to each of the N observations in $x^*_{(k)}{}^b$), $T(\hat{F}(x^*_{(k)}{}^b))$ be a plug-in estimate of the parameter of interest $\theta$ computer from the bootstrap sample $x^*_{(k)}{}^b$, $\hat{F}(y^*_{(k)}{}^b)$ be the empirical cumulative distribution function obtained from $y_{(k)}$ to assign a probability of 1/N to each of the N observations in $y^*_{(k)}{}^b$), $T(\hat{F}(y^*_{(k)}{}^b))$ be a plug-in estimate of the parameter of interest $\theta$ computer from the bootstrap sample $y^*_{(k)}{}^b$). The quantities $\hat{\theta}_{(k)}$, $\sigma(\hat{\theta}_{(k)})$, and $s^*_{(k)}{}^b)$ of Formula 1 are modified as follows:

$$\hat{\theta}_{(k)} = T(\hat{F}(y_{(k)})) - T(\hat{F}(x_{(k)})),$$

$$\sigma(\hat{\theta}_{(k)}) = \sqrt{\sigma^2(T(\hat{F}(y_{(k)}))) + \sigma^2(T(\hat{F}(x_{(k)})))},$$

$$s^{*b}_{(k)} = \frac{T(\hat{F}(y^{*b}_{(k)})) - T(\hat{F}(x^{*b}_{(k)})) - \hat{\theta}_{(k)}}{\sqrt{\sigma^2(T(\hat{F}(x^{*b}_{(k)}))) + \sigma^2(T(\hat{F}(x^{*b}_{(k)})))}}$$

Combination of nonparametric bootstrap distribution and a mixture SPRT described in this disclosure can be utilized in various online and computer-related applications. For example, combination of nonparametric bootstrap distribution and a mixture SPRT can be used in determining which of two or more website visual presentations is more effective, determining a query response of one or more products in response to an online search query, selecting between different organizations of a website, determining if one or more modules in a software system or mobile application are working or not working as designed, determining if replacement of a module in a software system or mobile application is necessary, and performing software tests more quickly and efficiently than conventional software tests. Described in greater detail below are non-limiting examples of applications of a combination of nonparametric bootstrap distribution and a mixture SPRT to determine a query response of one or more products in response to an online search query. The acts described below may be similarly applied to other various online and computer-related applications without departing from the scope of this disclosure, such as but not limited to determining which of two or more website visual presentations is more effective, selecting between different organizations of a website, determining if one or more modules in a software system or mobile application are working or not working as designed, determining if replacement of a module in a software system or mobile application is necessary, and performing software tests more quickly and efficiently than conventional software tests.

Figure 4A:
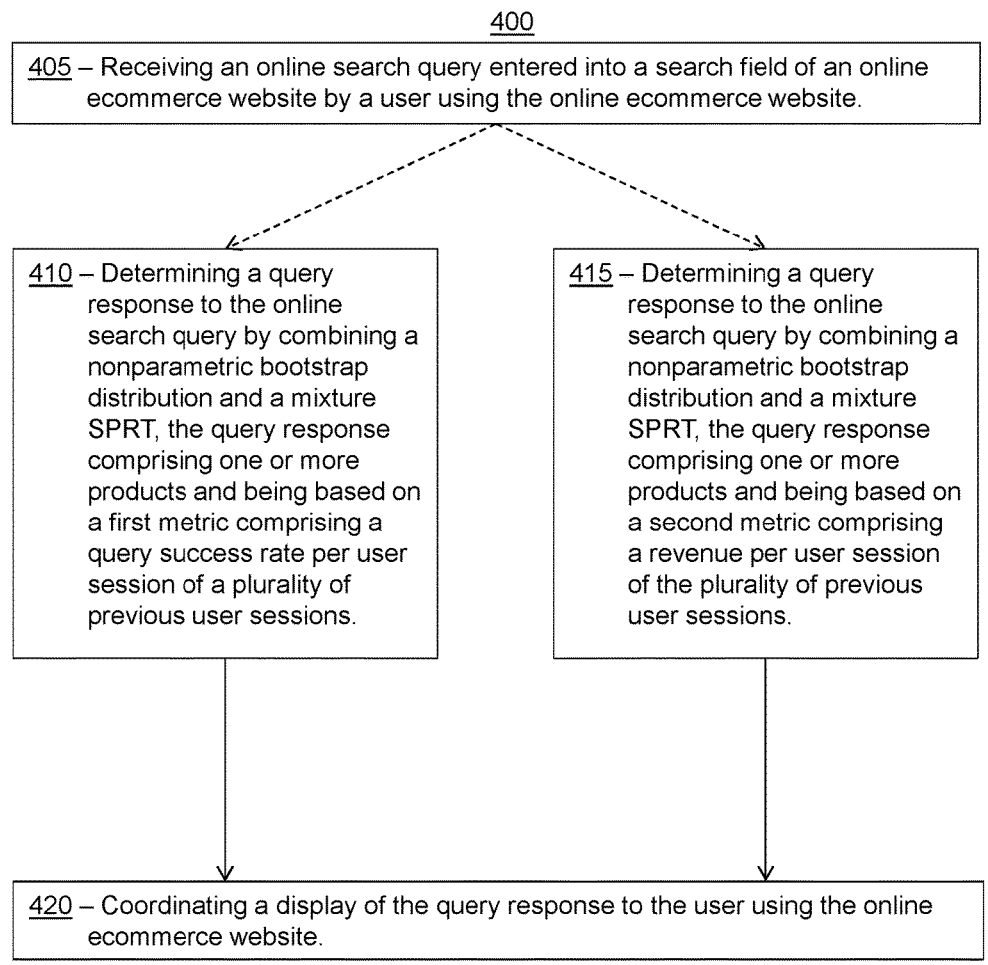
Figure 6:
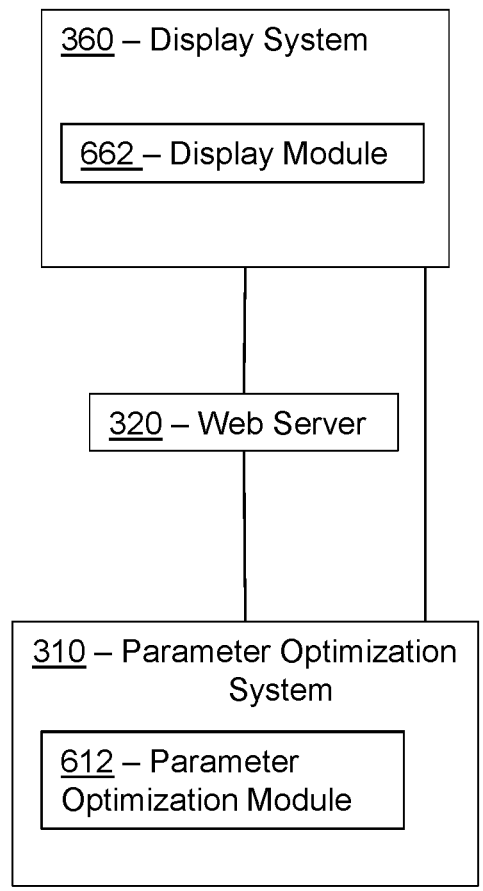
FIG. 6 illustrates a representative block diagram of a portion of the system of FIG. 3, according to an embodiment.

Turning ahead in the drawings, FIG. 4A illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 612 and/or 662 (FIG. 6). Such non-transitory memory storage modules can be part of a computer system such as parameter optimization system 310 (FIGS. 3 & 6) and/or display system 360 (FIGS. 3 & 6). The processing module(s) can be similar or identical to the processing module(s) described above with respect to computer system 100 (FIG. 1).

Method 400 can comprise an activity of receiving and storing data associated with a plurality of previous user sessions. The data associated with the plurality of previous user session can comprise a total number of successful queries per user session of the plurality of previous user session, a total number of queries per user session of the plurality of previous user session, an average revenue per user session of the plurality of previous user sessions. A majority of particular revenues of the average revenue per user session of the plurality of user sessions can comprise zero and nonzero values showing a heavy-tailed distribution.

Method 400 can comprise an activity 405 of receiving an online search query entered into a search field of an online ecommerce website by a user using the online ecommerce website.

In some embodiments, method 400 also can comprise an activity 410 (after activity 405) of determining a query response to the online search query by combining a nonparametric bootstrap distribution and a mixture SPRT, the query response comprising one or more products and being based on a first metric comprising a query success rate per user session of a plurality of previous user sessions. More particularly, the first metric can comprise a ratio of a total number of successful queries per user session of the plurality of previous user sessions to a total number of queries per user session of the plurality of previous user sessions. In some embodiments, a delta method can be used to compute the standard deviation for the first metric.

Figure 4B:
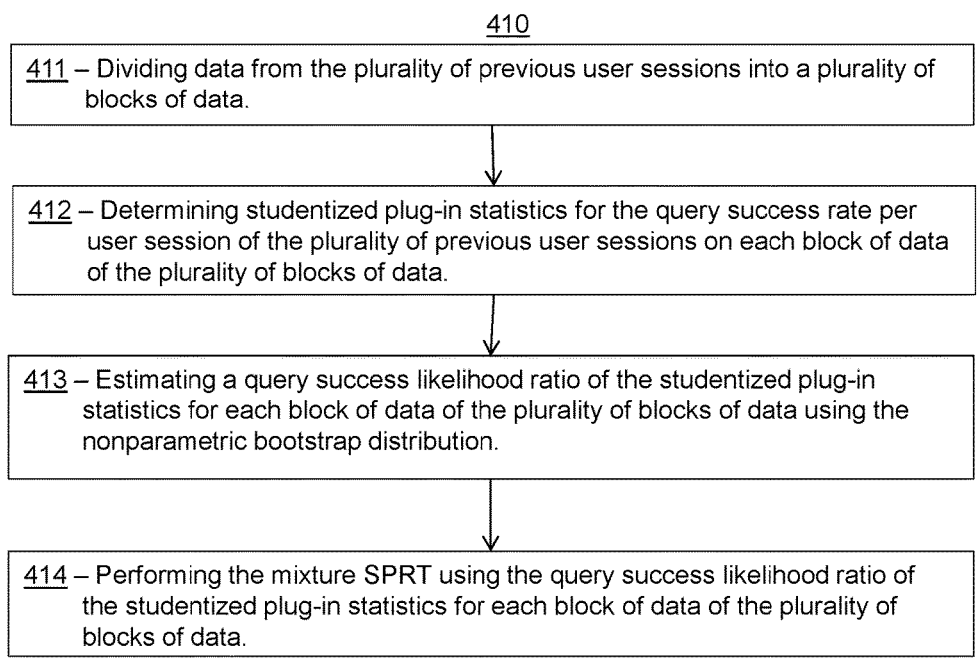

Turning to FIG. 4B, in more particular embodiments, activity 410 can comprise an activity 411 of dividing data from the plurality of previous user sessions into a plurality of blocks of data. In more particular embodiments, activity 411 can comprise: drawing a first random sample of size N from the plurality of blocks of data with a replacement from $x_{(k)}$, where k is an index value for each block of data of the plurality of blocks of data, and $x_{(k)}$ is a $k^{th}$ block of data of size N of the plurality of blocks of data; denoting the first random sample by $x^*_{(k)}$; and repeating (1) drawing additional random samples of size N from the plurality of blocks of data and (2) denoting the additional random samples B times to obtain a sequence $x^{*b}_{(k)}$, $1 \leq b \leq B$, where b is an index value for the first random sample and the additional random samples, and $x^{*b}_{(k)}$ is a $b^{th}$ bootstrap sample of size N obtained by sampling with replacement on the $k^{th}$ block of data $x_{(k)}$.

In some embodiments, activity 410 also can comprise an activity performing an A/B test on the first metric. In these and other embodiments, activity 411 can comprise: drawing a first random sample of size N from a control group A of the plurality of blocks of data with a replacement from $x_{(k)}$, where k is an index value for each block of data of the plurality of blocks of data, and $x_{(k)}$ is a $k^{th}$ block of data of size N from the control group A of the plurality of blocks of data; denoting the first random sample by $x^*_{(k)}$; repeating (1) drawing additional first random samples of size N from the control group A of plurality of blocks of data and (2) denoting the additional first random samples B times to obtain a sequence $x^{*b}_{(k)}$, $1 \leq b \leq B$, where b is an index value for the first random sample and the additional first random samples, and $x^{*b}_{(k)}$ is a $b^{th}$ bootstrap sample of size N obtained by sampling with replacement on the $k^{th}$ block of data $x_{(k)}$; drawing a second random sample of size N from a variable group B of the plurality of blocks of data with a replacement from $y_{(k)}$, where k is an index value for each block of data of the plurality of blocks of data, and $y_{(k)}$ is a $k^{th}$ block of data of size N from the variable group B of the plurality of blocks of data; denoting the second random sample by $y^*_{(k)}$; and repeating (1) drawing additional second random samples of size N from the variable group B of the plurality of blocks of data and (2) denoting the additional second random samples B times to obtain a sequence $y^{*b}_{(k)}$, $1 \leq b \leq B$, where b is an index value for the first random sample and the additional random samples, and $y^{*b}_{(k)}$ is a $b^{th}$ bootstrap sample of size N obtained by sampling with replacement on the $k^{th}$ block of data $y_{(k)}$.

In some embodiments, activity 410 can further comprise an activity 412 of determining studentized plug-in statistics for the query success rate per user session of the plurality of user sessions on each block of data of the plurality of blocks of data. In more particular embodiments, activity 412 can comprise determining, for each b, the studentized plug-in statistics $s^{*b}_{(k)}$ as $$s^{*b}_{(k)} = \frac{T(\hat{F}(x^{*b}_{(k)})) - \hat{\theta}_{(k)}}{\sigma(T(\hat{F}(x^{*b}_{(k)})))}$$

where $(T(\hat{F}(x^{*b}_{(k)})))$ is a plug-in estimate of the query success rate per user session of the plurality of previous user sessions determined from $x^{*b}_{(k)}$, $\hat{\theta}_{(k)}$ is a plug-in estimate of the query success rate per user session of the plurality of previous user sessions determined from the $k^{th}$ block of data $x_{(k)}$; and $\sigma$ is a standard deviation of $(T(\hat{F}(x^{*}{}_{(k)}{}^{b})))$.

As noted above, activity 410 can comprise an activity performing an A/B test on the first metric. In these and other embodiments, activity 412 can comprise determining, for each b, the studentized plug-in statistics $s^{*}{}_{(k)}{}^{b}$ as $$s_{(k)}^{*b} = \frac{T(\hat{F}(y_{(k)}^{*b})) - T(\hat{F}(x_{(k)}^{*b})) - \hat{\theta}_{(k)}}{\sqrt{\sigma^{2}(T(\hat{F}(x_{(k)}^{*b}))) + \sigma^{2}(T(\hat{F}(x_{(k)}^{*b}))) }}$$

where $(T(\hat{F}(y^{*}{}_{(k)}{}^{b})))$ is a plug-in estimate of the query success rate per user session of the plurality of previous user sessions of the variable group B determined from $y^{*}{}_{(k)}{}^{b}$, $y^{*}{}_{(k)}{}^{b}$ is a $b^{th}$ bootstrap sample of size N obtained by sampling with replacement on the $k^{th}$ block of data $y_{(k)}$, $(T(\hat{F}(x^{*}{}_{(k)}{}^{b})))$ is a plug-in estimate of the query success rate per user session of the plurality of previous user sessions of the control group A determined from $x^{*}{}_{(k)}{}^{b}$, $\hat{\theta}_{(k)}$ is $T(\hat{F}(y_{(k)})) - T(\hat{F}(x_{(k)}))$, $T(\hat{F}(y_{(k)}))$ is a plug-in estimate of the query success rate per user session of the plurality of previous user sessions determined from the variable group B, $T(\hat{F}(x_{(k)}))$ is a plug-in estimate of the query success rate per user session of the plurality of previous user sessions determined from the variable group A, and $\sigma$ is a standard deviation.

In some embodiments, activity 410 can further comprise an activity 413 of estimating a query success likelihood ratio of the studentized plug-in statistics for each block of data of the plurality of blocks of data using the nonparametric bootstrap distribution.

In some embodiments, activity 410 can further comprise an activity 414 of performing the mixture SPRT using the query success likelihood ratio of the studentized plug-in statistics for each block of data of the plurality of blocks of data. In more particular embodiments, activity 414 can comprise determining a likelihood ratio score $L_n$ determined as a number n of blocks of data of the plurality of blocks of data as $$L_{n} = \sum_{m=1}^{M} \left( \frac{\prod_{k=1}^{n} g_{(k)}^{*}\left(\frac{\hat{\theta}_{(k)} - \tilde{\theta}_{m}}{\sigma(\hat{\theta}_{(k)})}\right)}{\prod_{k=1}^{n} g_{(k)}^{*}\left(\frac{\hat{\theta}_{(k)} - \tilde{\theta}_{o}}{\sigma(\hat{\theta}_{(k)})}\right)} \right),$$

where $g^{*}{}_{(k)}(\bullet)$ is a probability density function obtained using a Gaussian kernel density estimate from the sequence $s^{*}{}_{(k)}{}^{b}$, $1 \leq b \leq B$, M is a total number of samples drawn from a prior probability distribution representing prior knowledge of a likelihood of the query success rate, m is an index value for different samples drawn from the prior probability distribution, $\tilde{\theta}_m$ is a $m^{th}$ sample drawn from the prior probability distribution, and $\tilde{\theta}_o$ is a baseline value for the query success rate per user session of the plurality of previous sessions.

As noted above, activity 410 can comprise an activity performing an A/B test on the first metric. In these and other embodiments, activity 414 can comprise determining a likelihood ratio score $L_n$ determined as a number n of blocks of data of the plurality of blocks of data as $$L_{n} = \sum_{m=1}^{M} \left( \frac{\prod_{k=1}^{n} g_{(k)}^{*}\left(\frac{\hat{\theta}_{(k)} - \tilde{\theta}_{m}}{\sigma(\hat{\theta}_{(k)})}\right)}{\prod_{k=1}^{n} g_{(k)}^{*}\left(\frac{\hat{\theta}_{(k)} - \tilde{\theta}_{o}}{\sigma(\hat{\theta}_{(k)})}\right)} \right)$$

where $g^{*}{}_{(k)}(\bullet)$ is a probability density function obtained using a Gaussian kernel density estimate from the sequence $s^{*}{}_{(k)}{}^{b}$, $1 \leq b \leq B$, M is a total number of samples drawn from a prior probability distribution representing prior knowledge of a likelihood of the query success rate, m is an index value for different samples drawn from the prior probability distribution, $\tilde{\theta}_m$ is a $m^{th}$ sample drawn from the prior probability distribution, and $\tilde{\theta}_o$ is a baseline value for the query success rate per user session of the plurality of previous sessions, and $\sigma(\hat{\theta}_{(k)}) = \sqrt{\sigma^{2}(T(\hat{F}(y_{(k)}))) + \sigma^{2}(T(\hat{F}(x_{(k)})))}$.

In some embodiments, activity 410 can further comprise an activity of rejecting a null hypothesis $\theta = \theta_0$ if $L_n > 1/\alpha$ for some n>1, where $\theta$ is the query success rate per user session of the plurality of previous sessions and $\alpha$ is a type 1 error threshold.

Returning to FIG. 4A, in some embodiments method 400 also can comprise an activity 415 of determining a query response to the online search query by combining a non-parametric bootstrap distribution and a mixture SPRT, the query response comprising one or more products and being based on a second metric comprising a revenue per user session of the plurality of previous user sessions.

Turning to FIG. 4C, in some embodiments, activity 415 can further comprise an activity 416 of dividing data from the plurality of previous user session into a plurality of blocks of data. In more particular embodiments, activity 416 can comprise: drawing a first random sample of size N from the plurality of blocks of data with a replacement from $x_{(k)}$, where k is an index value for each block of data of the plurality of blocks of data, and $x_{(k)}$ is a $k^{th}$ block of data of size N of the plurality of blocks of data; denoting the first random sample by $x^{*}{}_{(k)}$; and repeating (1) drawing additional random samples of size N from the plurality of blocks of data and (2) denoting the additional random samples B times to obtain a sequence $x^{*}{}_{(k)}{}^{b}$, $1 \leq b \leq B$, where b is an index value for the first random sample and the additional random samples, and $x^{*}{}_{(k)}{}^{b}$ is a $b^{th}$ bootstrap sample of size N obtained by sampling with replacement on the $k^{th}$ block of data $x_{(k)}$.

In some embodiments, activity 415 can further comprise an activity of performing an A/B test on the second metric. In these and other embodiments, activity 416 can comprise: drawing a first random sample of size N from a control group A of the plurality of blocks of data with a replacement from $x_{(k)}$, where k is an index value for each block of data of the plurality of blocks of data, and $x_{(k)}$ is a $k^{th}$ block of data of size N from the control group A of the plurality of blocks of data; denoting the first random sample by $x^{*}{}_{(k)}$; repeating (1) drawing additional first random samples of size N from the control group A of plurality of blocks of data and (2) denoting the additional first random samples B times to obtain a sequence $x^{*}{}_{(k)}{}^{b}$, $1 \leq b \leq B$, where b is an index value for the first random sample and the additional first random samples, and $x^{*}{}_{(k)}{}^{b}$ is a $b^{th}$ bootstrap sample of size N obtained by sampling with replacement on the $k^{th}$ block of data $x_{(k)}$; drawing a second random sample of size N from a variable group B of the plurality of blocks of data with a replacement from $y_{(k)}$, where k is an index value for each block of data of the plurality of blocks of data, and $y_{(k)}$ is a $k^{th}$ block of data of size N from the variable group B of the plurality of blocks of data; denoting the second random sample by $y^*_{(k)}$; and repeating (1) drawing additional second random samples of size N from the variable group B of the plurality of blocks of data and (2) denoting the additional second random samples B times to obtain a sequence $y^{*b}_{(k)}$, $1 \leq b \leq B$, where b is an index value for the first random sample and the additional random samples, and $y^{*b}_{(k)}$ is a $b^{th}$ bootstrap sample of size N obtained by sampling with replacement on the $k^{th}$ block of data $y_{(k)}$.

In some embodiments, activity 415 can further comprise activity 417 of determining studentized plug-in statistics for the revenue per user session of the plurality of previous user sessions on each block of data of the plurality of blocks of data. In more particular embodiments, activity 417 can comprise determining, for each b, the studentized plug-in statistics $s^{*b}_{(k)}$ as $$s^{*b}_{(k)} = \frac{T(\hat{F}(x^{*b}_{(k)})) - \hat{\theta}_{(k)}}{\sigma(T(\hat{F}(x^{*b}_{(k)})))}$$

where $(T(\hat{F}(x^{*b}_{(k)})))$ is a plug-in estimate of the revenue per user session of the plurality of previous user sessions determined from $x^{*b}_{(k)}$, $\hat{\theta}_{(k)}$ is a plug-in estimate of the revenue per user session of the plurality of previous user sessions determined from the $k^{th}$ block of data $x_{(k)}$, and $\sigma$ is a standard deviation of $(T(\hat{F}(x^{*b}_{(k)})))$.

As noted above, in some embodiments, activity 415 can further comprise an activity of performing an A/B test on the second metric. In these and other embodiments, activity 417 can comprise determining, for each b, the studentized plug-in statistics $s^{*b}_{(k)}$ as $$s^{*b}_{(k)} = \frac{T(\hat{F}(y^{*b}_{(k)})) - T(\hat{F}(x^{*b}_{(k)})) - \hat{\theta}_{(k)}}{\sqrt{\sigma^2(T(\hat{F}(x^{*b}_{(k)}))) + \sigma^2(T(\hat{F}(x^{*b}_{(k)}))) }}$$

where $(T(\hat{F}(y^{*b}_{(k)})))$ is a plug-in estimate of the revenue per user session of the plurality of previous user sessions of the variable group B determined from $y^{*b}_{(k)}$, $y^{*b}_{(k)}$ is a $b^{th}$ bootstrap sample of size N obtained by sampling with replacement on the $k^{th}$ block of data $y_{(k)}$, $(T(\hat{F}(x^{*b}_{(k)})))$ is a plug-in estimate of the revenue per user session of the plurality of previous user sessions of the control group A determined from $x^{*b}_{(k)}$, $\hat{\theta}_{(k)}$ is $T(\hat{F}(y_{(k)})) - T(\hat{F}(x_{(k)}))$, $T(\hat{F}(y_{(k)}))$ is a plug-in estimate of the revenue per user session of the plurality of previous user sessions determined from the variable group B, $T(\hat{F}(x_{(k)}))$ is a plug-in estimate of the revenue per user session of the plurality of previous user sessions determined from the variable group A, and $\sigma$ is a standard deviation.

In some embodiments, activity 415 can further comprise activity 418 of estimating a revenue likelihood ration of the studentized plug-in statistics for each block of data of the plurality of blocks of data using the nonparametric bootstrap distribution.

In some embodiments, activity 415 can further comprise an activity 419 of performing the mixture SPRT using the revenue likelihood ratio of the studentized plug-in statistics for each block of data of the plurality of blocks of data. In more particular embodiments, activity 419 can comprise determining a likelihood ratio score $L_n$ determined as a number n of blocks of data of the plurality of blocks of data as $$L_n = \sum_{m=1}^{M} \left( \frac{\prod_{k=1}^{n} g^*_{(k)}\left(\frac{\hat{\theta}_{(k)} - \tilde{\theta}_m}{\sigma(\hat{\theta}_{(k)})}\right)}{\prod_{k=1}^{n} g^*_{(k)}\left(\frac{\hat{\theta}_{(k)} - \tilde{\theta}_o}{\sigma(\hat{\theta}_{(k)})}\right)} \right)$$

where $g^*_{(k)}(\cdot)$ is a probability density function obtained using a Gaussian kernel density estimate from the sequence $s^{*b}_{(k)}$, $1 \leq b \leq B$, M is a total number of samples drawn from a prior probability distribution representing prior knowledge of a likelihood of the revenue per user session of the plurality of previous user sessions, m is an index value for different samples drawn from the prior probability distribution, $\tilde{\theta}_m$ is a $m^{th}$ sample drawn from the prior probability distribution, and $\tilde{\theta}_o$ is a baseline value for the revenue per user session of the plurality of previous user sessions.

As noted above, in some embodiments, activity 415 can further comprise an activity of performing an A/B test on the second metric. In these and other embodiments, activity 419 can comprise determining a likelihood ratio score $L_n$ determined as a number n of blocks of data of the plurality of blocks of data as $$L_n = \sum_{m=1}^{M} \left( \frac{\prod_{k=1}^{n} g^*_{(k)}\left(\frac{\hat{\theta}_{(k)} - \tilde{\theta}_m}{\sigma(\hat{\theta}_{(k)})}\right)}{\prod_{k=1}^{n} g^*_{(k)}\left(\frac{\hat{\theta}_{(k)} - \tilde{\theta}_o}{\sigma(\hat{\theta}_{(k)})}\right)} \right)$$

where $g^*_{(k)}(\cdot)$ is a probability density function obtained using a Gaussian kernel density estimate from the sequence $s^{*b}_{(k)}$, $1 \leq b \leq B$, M is a total number of samples drawn from a prior probability distribution representing prior knowledge of a likelihood of the revenue per user session, m is an index value for different samples drawn from the prior probability distribution, $\tilde{\theta}_m$ is a $m^{th}$ sample drawn from the prior probability distribution, and $\tilde{\theta}_o$ is a baseline value for the revenue per user session of the plurality of previous sessions, and $\sigma(\hat{\theta}_{(k)}) = \sqrt{\sigma^2(T(\hat{F}(y_{(k)}))) + \sigma^2(T(\hat{F}(x_{(k)})))}$.

It is noted that the first metric and the second metric can be chosen to test the flexibility of bootstrap mixture SPRT. A $\mathcal{N}(0, \tau^2)$ distribution can be used as prior $\pi(\theta)$, with $\tau$ being equal to a few percent (less than 5%) of the values of metrics computed on data before the start timestamp of the dataset under consideration. In some embodiments, data can be partitioned into blocks based on the order induced by the user session timestamp.

In some embodiments, use of post A/A tests can be utilized to estimate a type 1 error. For each dataset, the user sessions of the plurality of previous user session can be divided into two groups, a statistical test for the null hypothesis of zero difference in the metrics for the two groups can be performed, and the p-values computed. This process can be repeated multiple times, such as 250 times in some non-limiting examples. Because there is no true difference between the two groups, the p-value should have theoretical uniform distribution between 0 and 1. Consequently, the Q-Q plots for the realized p-values from different random splits and the uniform distribution should be the line of slope 1. To estimate the power of the test, for each random split of the dataset, the realized difference in the metrics for the two groups are added to some small positive constants. For each choice of the additive constant, the number of times the null hypothesis is rejected using p-value <0.05 as a null hypothesis rejection criteria can be checked.

Through experimental testing, a large inflation of type 1 error under conventional sequential monitoring in case of classical fixed sample sized z-test was observed. Using this conventional sequential monitoring, the p-values are computed daily using the data collected until that day. A Q-Q plot for the minimum p-value observed from daily observations can be plotted, modeling the scenario where one waits until the data shows significance. Using this conventional sequential monitoring, waiting until the p-value is <0.05 and stopping the test on that day resulted in type 1 error rate of at least 30%. By contrast, a Q-Q plot of always valid p-value in the case of bootstrap distribution mixture SPRT described herein with the block size 5,000 was shown to be close to the line of slope 1. This implies that bootstrap distribution mixture SPRT controls type 1 error at any time under continuous monitoring. The p-value can be the final one at the end of all the blocks, understanding that the p-value is non-increasing in this case.

In the non-limiting experimental testing, a choice of block size of 5,000 was determined by post A/A tests with different block sizes, looking at the corresponding Q-Q plots, and making sure the Q-Q plots stay above but close to the line of slope 1. Smaller block size can make the bootstrap approximation less accurate, while larger block size makes this procedure more conservative in case of some upper limit on the number of samples available for the test. This is consequence of fewer intermediate observations in a finite length dataset, resulting in Doob's martingale inequality being far from being tight.

In testing, a comparison of the power of the bootstrap distribution mixture SPRT with a conventional z-test on entire search query data was performed. The standard deviation for the query success rate computed using the delta method was used for a z-test. An additive constant to the realized difference was used. Focusing first on the query success rate, a small loss in power of the bootstrap mixture distribution compared to the z-test on the entire dataset was observed. Some loss in power can be expected because of the sequential nature of the procedure on a finite dataset; equivalently, the bootstrap distribution mixture SPRT requires a larger number of samples to achieve the same power as the fixed sample size tests. This can be the price paid for the flexibility of continuous monitoring. The loss in power quickly becomes negligible as true change becomes larger. Focusing on the revenue metric, it was noted that the z-test on the entire data had smaller power than the bootstrapped distribution mixture SPRT. In this case, the mean of data does not confirm to the normal distribution used to justify the z-test. Thus, not only does the bootstrap distribution mixture SPRT allow continuous monitoring, it also can comprise a higher power for revenue metrics. For the fixed dataset size, the power of the test appears higher for the smaller block size, inline with the observations made earlier about the small block size.

An average test duration of each test using a bootstrap distribution mixture SPRT was also recorded. Test duration is the numbers of samples consumed in each split until either all the data is exhausted or the null hypothesis is rejected. The average over the 250 random splits of the dataset was taken. The null hypothesis was rejected quickly for large changes, unlike the fixed sample size test where one has to wait until the precomputed number of samples have been collected. This avoids wasteful data collection and unnecessary wait in case of misspecification in the minimum effect size used to determine the number of samples to be collected. Again, the smaller block size has smaller test duration.

Returning to FIG. 4A, method 400 can further comprise an activity 420 of coordinating a display of the query response to the user using the online ecommerce website.

Figure 5:
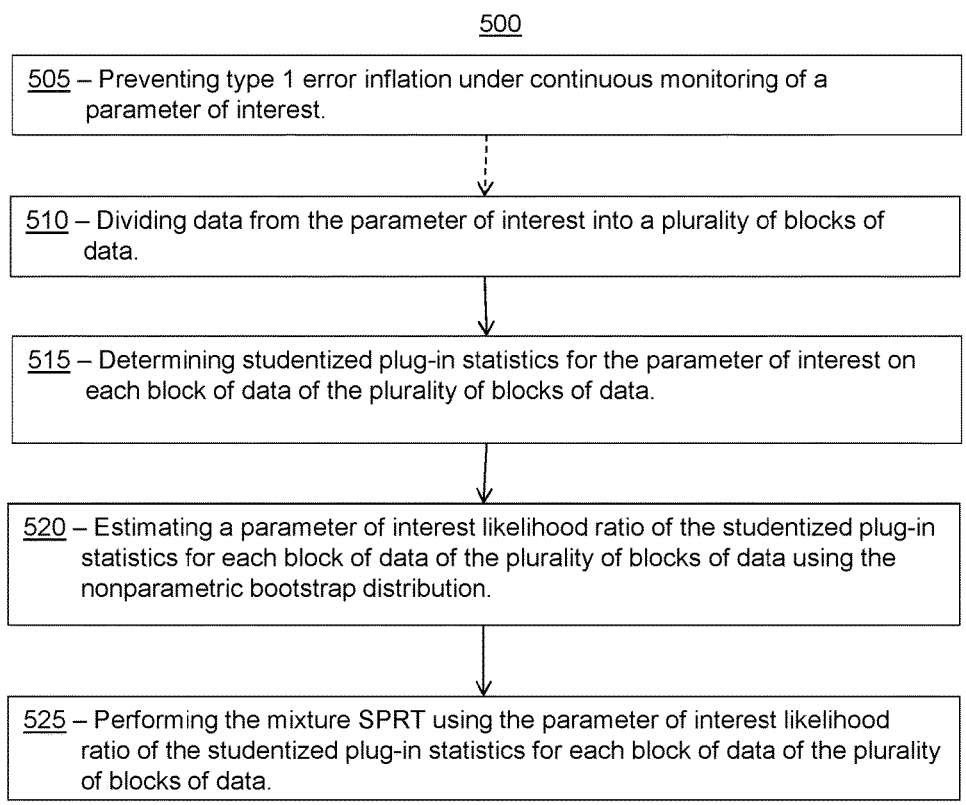
FIG. 5 is a flowchart for a method, according to additional embodiments.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules 612 and/or 662 (FIG. 6). Such non-transitory memory storage modules can be part of a computer system such as parameter optimization system 310 (FIGS. 3 & 6) and/or display system 360 (FIGS. 3 & 6). The processing module(s) can be similar or identical to the processing module(s) described above with respect to computer system 100 (FIG. 1).

Returning to FIG. 5, in some embodiments, method 500 can comprise an activity 505 of preventing type 1 error inflation under continuous monitoring of a parameter of interest. According to some aspects, the parameter of interest can comprise at least one of the following: a plurality of visual presentations of an ecommerce web site; a query response to an online search query, the query response comprising one or more products; a plurality of organizational features of an ecommerce website; functioning of a plurality of modules in a software system; and functioning of software.

In more particular embodiments, activity 505 can comprise an activity 510 of dividing data from the parameter of interest into a plurality of blocks of data. In even more particular embodiments, activity 510 of dividing data from the parameter of interest into the plurality of blocks of data can comprise: drawing a first random sample of size N from the plurality of blocks of data with a replacement from $x_{(k)}$, where k is an index value for each block of data of the plurality of blocks of data, and $x_{(k)}$ is a $k^{th}$ block of data of size N of the plurality of blocks of data; denoting the first random sample by $x^*_{(k)}$; and repeating (1) drawing additional random samples of size N from the plurality of blocks of data and (2) denoting the additional random samples B times to obtain a sequence $x^*_{(k)}{}^b$, $1 \leq b \leq B$, where b is an index value for the first random sample and the additional random samples, and $x^*_{(k)}{}^b$ is a $b^{th}$ bootstrap sample of size N obtained by sampling with replacement on the $k^{th}$ block of data $x_{(k)}$.

In more particular embodiments, activity 505 can comprise an activity 515 of determining studentized plug-in statistics for the parameter of interest on each block of data of the plurality of blocks of data. In more particular embodiments, activity 515 of determining the studentized plug-in statistics for the parameter of interest on each block of data of the plurality of blocks of data can comprise determining, for each b, the studentized plug-in statistics $s^{*b}_{(k)}$ as $$s^{*b}_{(k)} = \frac{T(\hat{F}(x^{*b}_{(k)})) - \hat{\theta}_{(k)}}{\sigma(T(\hat{F}(x^{*b}_{(k)})))}$$

where $(T(\hat{F}(x^{*b}_{(k)})))$ is a plug-in estimate of the parameter of interest determined from $x^{*b}_{(k)}$, $\hat{\theta}_{(k)}$ is a plug-in estimate of the parameter of interest determined from the $k^{th}$ block of data $x_{(k)}$; and $\sigma$ is a standard deviation of $(T(\hat{F}(x^{*b}_{(k)})))$.

In more particular embodiments, activity 505 can comprise an activity 520 of estimating a parameter of interest likelihood ratio of the studentized plug-in statistics for each block of data of the plurality of blocks of data using a nonparametric bootstrap distribution.

In more particular embodiments, activity 505 can comprise an activity 525 of performing a mixture SPRT using the parameter of interest likelihood ration of the studentized plug-in statistics for each block of data of the plurality of blocks of data. In more particular embodiments, activity 525 can comprise determining a likelihood ratio score $L_n$ determined as a number n of blocks of data of the plurality of blocks of data as $$L_n = \sum_{m=1}^{M} \left( \frac{\prod_{k=1}^{n} g^*_{(k)}\left(\frac{\hat{\theta}_{(k)} - \tilde{\theta}_m}{\sigma(\hat{\theta}_{(k)})}\right)}{\prod_{k=1}^{n} g^*_{(k)}\left(\frac{\hat{\theta}_{(k)} - \tilde{\theta}_o}{\sigma(\hat{\theta}_{(k)})}\right)} \right)$$

where $g^*_{(k)}(\bullet)$ is a probability density function obtained using a Gaussian kernel density estimate from the sequence $s^{*b}_{(k)}$, $1 \le b \le B$, M is a total number of samples drawn from a prior probability distribution representing prior knowledge of a likelihood of the parameter of interest, m is an index value for different samples drawn from the prior probability distribution, $\tilde{\theta}_m$ is a $m^{th}$ sample drawn from the prior probability distribution, and $\tilde{\theta}_o$ is a baseline value for the parameter of interest.

In some embodiments, method 500 can comprise an act of preventing the type 1 error inflation under continuous monitoring of the parameter of interest by rejecting a null hypothesis $\theta = \theta_0$ if $L_n > 1/\alpha$ for some $n > 1$, where $\theta$ is the parameter of interest and $\alpha$ is a type 1 error threshold.

FIG. 6 illustrates a block diagram of a portion of system 300 comprising parameter optimization system 310, web server 320, and display system 360, according to the embodiment shown in FIG. 3. Each of parameter optimization system 310, web server 320, and/or display system 360, is merely exemplary and not limited to the embodiments presented herein. Each of parameter optimization system 310, web server 320, and/or display system 360, can be employed in many different embodiments or examples not specifically depicted or described herein. In some embodiments, certain elements or modules of parameter optimization system 310, web server 320, and/or display system 360, can perform various procedures, processes, and/or acts. In other embodiments, the procedures, processes, and/or acts can be performed by other suitable elements or modules.

In many embodiments, parameter optimization system 310 can comprise non-transitory memory storage modules 612, and display system 360 can comprise a non-transitory memory storage module 662. Memory storage module 612 can be referred to as parameter optimization module 612. Memory storage module 662 can be referred to as display module 662.

In many embodiments, parameter optimization module 612 can store computing instructions configured to run on one or more processing modules and perform one or more acts of methods 400 (FIGS. 4A-C) (e.g., activity 405 of receiving an online search query entered into a search field of an online ecommerce web site by a user using the online ecommerce web site (FIG. 4A); activity 410 of determining a query response to the online search query by combining a nonparametric bootstrap distribution and a mixture SPRT, the query response comprising one or more products and being based on a first metric comprising a query success rate per user session of a plurality of previous user sessions (FIG. 4A); activity 411 of dividing data from the plurality of previous user sessions into a plurality of blocks of data (FIG. 4B); activity 412 of determining studentized plug-in statistics for the query success rate per user session of the plurality of previous user sessions on each block of data of the plurality of blocks of data (FIG. 4B); activity 413 of estimating a query success likelihood ratio of the studentized plug-in statistics for each block of data of the plurality of blocks of data using the nonparametric bootstrap distribution (FIG. 4B); activity 414 of performing the mixture SPRT using the query success likelihood ratio of the studentized plug-in statistics for each block of data of the plurality of blocks of data (FIG. 4B); activity 415 of determining a query response to the online search query by combining a nonparametric bootstrap distribution and a mixture SPRT, the query response comprising one or more products and being based on a second metric comprising a revenue per user session of the plurality of previous user sessions (FIG. 4A); activity 416 of dividing data from the plurality of previous user sessions into a plurality of blocks of data (FIG. 4C); activity 417 of determining studentized plug-in statistics for the revenue per user session of the plurality of previous user sessions on each block of data of the plurality of blocks of data (FIG. 4C); activity 418 of estimating a revenue likelihood ratio of the studentized plug-in statistics for each block of data of the plurality of blocks of data using the nonparametric bootstrap distribution (FIG. 4C); and/or activity 419 of performing the mixture SPRT using the revenue likelihood ratio of the studentized plug-in statistics for each block of data of the plurality of blocks of data (FIG. 4C)).

Moreover, in many embodiments, parameter optimization module 612 can store computing instructions configured to run on one or more processing modules and perform one or more acts of methods 500 (FIG. 5) (e.g., activity 505 of preventing type 1 error inflation under continuous monitoring of a parameter of interest; activity 510 of dividing data from the parameter of interest into a plurality of blocks of data; activity 515 of determining studentized plug-in statistics for the parameter of interest on each block of data of the plurality of blocks of data; activity 520 of estimating a parameter of interest likelihood ratio of the studentized plug-in statistics for each block of data of the plurality of blocks of data using the nonparametric bootstrap distribution; and/or activity 525 of performing the mixture SPRT using the parameter of interest likelihood ratio of the studentized plug-in statistics for each block of data of the plurality of blocks of data (FIG. 5)). In some embodiments, display module 662 can store computing instructions configured to run on one or more processing modules and perform one or more acts of methods 400 (FIG. 4A) (e.g., activity 420 of coordinating a display of the query response to the user using the online ecommerce website (FIG. 4A)).

A combination of a bootstrap distribution and a mixture SPRT for hypothesis test of complex metrics in a sequential manner is disclosed herein. The combination of a bootstrap distribution and a mixture SPRT can allow the flexibility of continuous monitoring of data while controlling the type 1 error at any time, has good power, and allows quick inference in case the true change is larger than the estimated minimum effect size. The nonparametric nature of this test makes it suitable for the cases where the data generation distribution is unknown or hard to model.

Although combination of bootstrap distribution and mixture SPRT has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 4A-C and 5 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processing modules; and
one or more non-transitory storage modules storing computing instructions configured to run on the one or more processing modules and perform acts of:
receiving an online search query entered into a search field of an online ecommerce website by a user using the online ecommerce website;
determining a query response to the online search query by combining a nonparametric bootstrap distribution and a mixture sequential probability ratio test (SPRT), the query response comprising one or more products and being based on one of:
(1) a first metric comprising a query success rate per user session of a plurality of previous user sessions, or
(2) a second metric comprising a revenue per user session of the plurality of previous user sessions, wherein the first metric comprises a ratio of a total number of successful queries per user session of the plurality of previous user sessions to a total number of queries per user session of the plurality of previous user sessions; and
coordinating a display of the query response to the user using the online ecommerce website, wherein:
determining the query response to the online search query further comprises:
dividing data from the plurality of previous user sessions into a plurality of blocks of data; and
determining studentized plug-in statistics for the query success rate per user session of the plurality of previous user sessions on each block of data of the plurality of blocks of data.

2. The system of claim 1, wherein the query response to the online search query is based on the first metric, and wherein determining the query response to the online search query further comprises:
estimating a query success likelihood ratio of the studentized plug-in statistics for each block of data of the plurality of blocks of data using the nonparametric bootstrap distribution; and
performing the mixture SPRT using the query success likelihood ratio of the studentized plug-in statistics for each block of data of the plurality of blocks of data by treating each block of data of the plurality of blocks of data as a unit observation.

3. The system of claim 2, wherein:
dividing the data from the plurality of previous user sessions comprises:
drawing a first random sample of size N from the plurality of blocks of data with a replacement from $x_{(k)}$, where k is an index value for each block of data of the plurality of blocks of data, and $x_{(k)}$ is a $k^{th}$ block of data of size N of the plurality of blocks of data;
denoting the first random sample by $x^*_{(k)}$; and
repeating (1) drawing additional random samples of size N from the plurality of blocks of data and (2) denoting the additional random samples B times to obtain a sequence $x^*_{(k)}{}^b$, $1 \le b \le B$, where b is an index value for the first random sample and the additional random samples, and $x^*_{(k)}{}^b$ is a $b^{th}$ bootstrap sample of size N obtained by sampling with replacement on the $k^{th}$ block of data $x_{(k)}$;
determining the studentized plug-in statistics for the query success rate per user session of the plurality of previous user sessions on each block of data of the plurality of blocks of data comprises:
determining, for each b, the studentized plug-in statistics $s^*_{(k)}{}^b$ as:

$$s^{*b}_{(k)} = \frac{T(\hat{F}(x^{*b}_{(k)})) - \hat{\theta}_{(k)}}{\sigma(T(\hat{F}(x^{*b}_{(k)})))},$$

where $(T(\hat{F}(x^*_{(k)}{}^b)))$ is a plug-in estimate of the query success rate per user session of the plurality of previous user sessions determined from $x^*_{(k)}{}^b$, $\hat{\theta}_{(k)}$ is a plug-in estimate of the query success rate per user session of the plurality of previous user sessions determined from the $k^{th}$ block of data $x_{(k)}$, and $\sigma$ is a standard deviation of $(T(\hat{F}(x^*_{(k)}{}^b)))$;

performing the mixture SPRT using the query success likelihood ratio of the studentized plug-in statistics for each block of data of the plurality of blocks of data by treating each block of data of the plurality of blocks of data as the unit observation comprises:

determining a likelihood ratio score $L_n$ determined as a number n of blocks of data of the plurality of blocks of data as:

$$L_n = \sum_{m=1}^{M} \left( \frac{\prod_{k=1}^{n} g^*_{(k)}\left(\frac{\hat{\theta}_{(k)} - \tilde{\theta}_m}{\sigma(\hat{\theta}_{(k)})}\right)}{\prod_{k=1}^{n} g^*_{(k)}\left(\frac{\hat{\theta}_{(k)} - \tilde{\theta}_o}{\sigma(\hat{\theta}_{(k)})}\right)} \right),$$

where $g^*_{(k)}(\bullet)$ is a probability density function obtained using a Gaussian kernel density estimate from a sequence $s^*_{(k)}{}^b$, $1 \leq b \leq B$, M is a total number of samples drawn from a prior probability distribution representing prior knowledge of a likelihood of the query success rate per user session, m is an index value for different samples drawn from the prior probability distribution, $\tilde{\theta}_m$ is a $m^{th}$ sample drawn from the prior probability distribution, and $\tilde{\theta}_o$ is a baseline value for the query success rate per user session of the plurality of previous user sessions; and determining the query response to the online search query further comprises rejecting a null hypothesis $\theta = \theta_0$ if $L_n > 1/\alpha$ for some $n > 1$, where $\theta$ is the query success rate per user session of the plurality of previous user sessions and $\alpha$ is a type 1 error threshold.

4. The system of claim 2, wherein:

the one or more non-transitory storage modules storing the computing instructions are configured to run on the one or more processing modules and perform an act of performing an A/B test on the first metric;

dividing the data from the plurality of previous user sessions comprises:

drawing a first random sample of size N from a control group A of the plurality of blocks of data with a replacement from $x_{(k)}$, where k is an index value for each block of data of the plurality of blocks of data, and $x_{(k)}$ is a $k^{th}$ block of data of size N from the control group A of the plurality of blocks of data;

denoting the first random sample by $x^*_{(k)}$;

repeating (1) drawing additional first random samples of size N from the control group A of plurality of blocks of data and (2) denoting the additional first random samples B times to obtain a sequence $x^*_{(k)}{}^b$, $1 < b < B$, where b is an index value for the first random sample and the additional first random samples, and $x^*_{(k)}{}^b$ is a $b^{th}$ bootstrap sample of size N obtained by sampling with replacement on the $k^{th}$ block of data $x_{(k)}$;

drawing a second random sample of size N from a variable group B of the plurality of blocks of data with a replacement from $y_{(k)}$, where k is an index value for each block of data of the plurality of blocks of data, and $y_{(k)}$ is a $k^{th}$ block of data of size N from the variable group B of the plurality of blocks of data;

denoting the second random sample by $y^*_{(k)}$; and repeating (1) drawing additional second random samples of size N from the variable group B of the plurality of blocks of data and (2) denoting the additional second random samples B times to obtain a sequence $y^*_{(k)}{}^b$, $1 \leq b \leq B$, where b is an index value for the first random sample and the additional random samples, and $y^*_{(k)}{}^b$ is a $b^{th}$ bootstrap sample of size N obtained by sampling with replacement on the $k^{th}$ block of data $y_{(k)}$;

determining the studentized plug-in statistics for the query success rate per user session of the plurality of previous user sessions on each block of data of the plurality of blocks of data comprises:

determining, for each b, the studentized plug-in statistics $s^{*b}_{(k)}$ as:

$$s^{*b}_{(k)} = \frac{T(\hat{F}(y^{*b}_{(k)})) - T(\hat{F}(x^{*b}_{(k)})) - \hat{\theta}_{(k)}}{\sqrt{\sigma^2(T(\hat{F}(x^{*b}_{(k)}))) + \sigma^2(T(\hat{F}(x^{*b}_{(k)})))}},$$

where $(T(\hat{F}(y^*_{(k)}{}^b)))$ is a plug-in estimate of the query success rate per user session of the plurality of previous user sessions of the variable group B determined from $y^*_{(k)}{}^b$, $y^*_{(k)}{}^b$ is a $b^{th}$ bootstrap sample of size N obtained by sampling with replacement on the $k^{th}$ block of data $y_{(k)}$, $(T(\hat{F}(x^*_{(k)}{}^b)))$ is a plug-in estimate of the query success rate per user session of the plurality of previous user sessions of the control group A determined from $x^*_{(k)}{}^b$, $\hat{\theta}_{(k)}$ is $T(\hat{F}(y_{(k)})) - T(\hat{F}(x_{(k)}))$, $T(\hat{F}(y_{(k)}))$ is a plug-in estimate of the query success rate per user session of the plurality of previous user sessions determined from the variable group B, $T(\hat{F}(x_{(k)}))$ is a plug-in estimate of the query success rate per user session of the plurality of previous user sessions determined from the control group A, and $\sigma$ is a standard deviation;

performing the mixture SPRT using the query success likelihood ratio of the studentized plug-in statistics for each block of data of the plurality of blocks of data by treating each block of data of the plurality of blocks of data as the unit observation comprises:

determining a likelihood ratio score $L_n$ determined as a number n of blocks of data of the plurality of blocks of data as:

$$L_n = \sum_{m=1}^{M} \left( \frac{\prod_{k=1}^{n} g^*_{(k)}\left(\frac{\hat{\theta}_{(k)} - \tilde{\theta}_m}{\sigma(\hat{\theta}_{(k)})}\right)}{\prod_{k=1}^{n} g^*_{(k)}\left(\frac{\hat{\theta}_{(k)} - \tilde{\theta}_o}{\sigma(\hat{\theta}_{(k)})}\right)} \right),$$

where $g^*_{(k)}(\bullet)$ is a probability density function obtained using a Gaussian kernel density estimate from a sequence $s^*_{(k)}{}^b$, $1 \leq b \leq B$, M is a total number of samples drawn from a prior probability distribution representing prior knowledge of a likelihood of the query success rate per user session, m is an index value for different samples drawn from the prior probability distribution, $\tilde{\theta}_m$ is a $m^{th}$ sample drawn from the prior probability distribution, and $\tilde{\theta}_o$ is a baseline value for the query success rate per user session of the plurality of previous user sessions, and $\sigma(\hat{\theta}_{(k)}) = \sqrt{\sigma^2(T(\hat{F}(y_{(k)}))) + \sigma^2(T(\hat{F}(x_{(k)})))}$; and determining the query response to the online search query further comprises rejecting a null hypothesis, the null hypothesis $\theta = \theta_0$ if $L_n, > 1/\alpha$ for some $n > 1$, where $\theta$ is the query success rate per user session of the plurality of previous user sessions and $\alpha$ is a type 1 error threshold.

5. The system of claim 1, wherein the query response to the online search query is based on the second metric, and wherein determining the query response to the online search query further comprises:
dividing data from the plurality of previous user sessions into a plurality of blocks of data;
determining studentized plug-in statistics for the revenue per user session of the plurality of previous user sessions on each block of data of the plurality of blocks of data;
estimating a revenue likelihood ratio of the studentized plug-in statistics for each block of data of the plurality of blocks of data using the nonparametric bootstrap distribution; and
performing the mixture SPRT using the revenue likelihood ratio of the studentized plug-in statistics for each block of data of the plurality of blocks of data by treating each block of data of the plurality of blocks of data as a unit observation.

6. The system of claim 5, wherein:
dividing the data from the plurality of previous user sessions into the plurality of blocks of data comprises:
drawing a first random sample of size N from the plurality of blocks of data with a replacement from $x_{(k)}$, where k is an index value for each block of data of the plurality of blocks of data, and $x_{(k)}$ is a $k^{th}$ block of data of size N of the plurality of blocks of data;
denoting the first random sample by $x^*_{(k)}$; and
repeating (1) drawing additional random samples of size N from the plurality of blocks of data and (2) denoting the additional random samples B times to obtain a sequence $x^*_{(k)}{}^b$, $1 \leq b \leq B$, where b is an index value for the first random sample and the additional random samples, and $x^*_{(k)}{}^b$ is a $b^{th}$ bootstrap sample of size N obtained by sampling with replacement on the $k^{th}$ block of data $x_{(k)}$;
determining the studentized plug-in statistics for the revenue per user session of the plurality of previous user sessions on each block of data of the plurality of blocks of data comprises:
determining, for each b, the studentized plug-in statistics $s^*_{(k)}{}^b$ as:

$$s^{*b}_{(k)} = \frac{T(\hat{F}(x^{*b}_{(k)})) - \hat{\theta}_{(k)}}{\sigma(T(\hat{F}(x^{*b}_{(k)})))},$$

where $(T(\hat{F}(x^*_{(k)}{}^b)))$ is a plug-in estimate of the revenue per user session of the plurality of previous user sessions determined from $x^*_{(k)}{}^b$, $\hat{\theta}_{(k)}$ is a plug-in estimate of the revenue per user session of the plurality of previous user sessions determined from the $k^{th}$ block of data $x_{(k)}$, and $\sigma$ is a standard deviation of $(T(\hat{F}(x^*_{(k)}{}^b)))$;

performing the mixture SPRT using the revenue likelihood ratio of the studentized plug-in statistics for each block of data of the plurality of blocks of data by treating each block of data of the plurality of blocks of data as the unit observation comprises:
determining a likelihood ratio score $L_n$ determined as a number n of blocks of data of the plurality of blocks of data as:

$$L_n = \sum_{m=1}^{M} \left( \frac{\prod_{k=1}^{n} g^*_{(k)}\left(\frac{\hat{\theta}_{(k)} - \tilde{\theta}_m}{\sigma(\hat{\theta}_{(k)})}\right)}{\prod_{k=1}^{n} g^*_{(k)}\left(\frac{\hat{\theta}_{(k)} - \tilde{\theta}_o}{\sigma(\hat{\theta}_{(k)})}\right)} \right),$$

where $g^*_{(k)}(\bullet)$ is a probability density function obtained using a Gaussian kernel density estimate from a sequence $s^*_{(k)}{}^b$, $1 \leq b \leq B$, M is a total number of samples drawn from a prior probability distribution representing prior knowledge of a likelihood of the revenue per user session of the plurality of previous user sessions, m is an index value for different samples drawn from the prior probability distribution, $\tilde{\theta}_m$ is a $m^{th}$ sample drawn from the prior probability distribution, and $\tilde{\theta}_o$ is a baseline value for the revenue per user session of the plurality of previous user sessions; and
determining the query response to the online search query further comprises rejecting a null hypothesis $\theta = \theta_0$ if $L_n > 1/\alpha$ for some $n > 1$, where $\theta$ is the revenue per user session of the plurality of previous user sessions and $\alpha$ is a type 1 error threshold.

7. The system of claim 5, wherein:
the one or more non-transitory storage modules storing the computing instructions are configured to run on the one or more processing modules and perform an act of performing an A/B test on the second metric;
dividing the data from the plurality of previous user sessions comprises:
drawing a first random sample of size N from a control group A of the plurality of blocks of data with a replacement from $x_{(k)}$, where k is an index value for each block of data of the plurality of blocks of data, and $x_{(k)}$ is a $k^{th}$ block of data of size N from the control group A of the plurality of blocks of data;
denoting the first random sample by $x^*_{(k)}$;
repeating (1) drawing additional first random samples of size N from the control group A of the plurality of blocks of data and (2) denoting the additional first random samples B times to obtain a sequence $x^*_{(k)}{}^b$, $1 \leq b \leq B$, where b is an index value for the first random sample and the additional first random samples, and $x^*_{(k)}{}^b$ is a $b^{th}$ bootstrap sample of size N obtained by sampling with replacement on the $k^{th}$ block of data $x_{(k)}$;
drawing a second random sample of size N from a variable group B of the plurality of blocks of data with a replacement from $y_{(k)}$, where k is an index value for each block of data of the plurality of blocks of data, and $y_{(k)}$ is a $k^{th}$ block of data of size N from the variable group B of the plurality of blocks of data;

denoting the second random sample by $y^*_{(k)}$; and repeating (1) drawing additional second random samples of size N from the variable group B of the plurality of blocks of data and (2) denoting the additional second random samples B times to obtain a sequence $y^{*b}_{(k)}$, $1 \leq b \leq B$, where b is an index value for the first random sample and the additional random samples, and $y^{*b}_{(k)}$ is a $b^{th}$ bootstrap sample of size N obtained by sampling with replacement on the $k^{th}$ block of data $y_{(k)}$;

determining the studentized plug-in statistics for the revenue per user session of the plurality of previous user sessions on each block of data of the plurality of blocks of data comprises:

determining, for each b, the studentized plug-in statistics $s^{*b}_{(k)}$ as:

$$s^{*b}_{(k)} = \frac{T(\hat{F}(y^{*b}_{(k)})) - T(\hat{F}(x^{*b}_{(k)})) - \hat{\theta}_{(k)}}{\sqrt{\sigma^2(T(\hat{F}(x^{*b}_{(k)}))) + \sigma^2(T(\hat{F}(x^{*b}_{(k)})))}},$$

where $(T(\hat{F}(y^{*b}_{(k)})))$ is a plug-in estimate of the revenue per user session of the plurality of previous user sessions of the variable group B determined from $y^{*b}_{(k)}$, $y^{*b}_{(k)}$ is a $b^{th}$ bootstrap sample of size N obtained by sampling with replacement on the $k^{th}$ block of data $y_{(k)}$, $(T(\hat{F}(x^{*b}_{(k)})))$ is a plug-in estimate of the revenue per user session of the plurality of previous user sessions of the control group A determined from $x^{*b}_{(k)}$, $\hat{\theta}_{(k)}$ is $T(\hat{F}(y_{(k)})) - T(\hat{F}(x_{(k)}))$, $T(\hat{F}(y_{(k)}))$ is a plug-in estimate of the revenue per user session of the plurality of previous user sessions determined from the variable group B, $T(\hat{F}(x_{(k)}))$ is a plug-in estimate of the revenue per user session of the plurality of previous user sessions determined from the control group A, and $\sigma$ is a standard deviation;

performing the mixture SPRT using the revenue likelihood ratio of the studentized plug-in statistics for each block of data of the plurality of blocks of data by treating each block of data of the plurality of blocks of data as the unit observation comprises:

determining a likelihood ratio score $L_n$ determined as a number n of blocks of data of the plurality of blocks of data as:

$$L_n = \sum_{m=1}^{M} \left( \frac{\prod_{k=1}^{n} g^*_{(k)}\left(\frac{\hat{\theta}_{(k)} - \hat{\theta}_m}{\sigma(\hat{\theta}_{(k)})}\right)}{\prod_{k=1}^{n} g^*_{(k)}\left(\frac{\hat{\theta}_{(k)} - \hat{\theta}_o}{\sigma(\hat{\theta}_{(k)})}\right)} \right),$$

where $g^*_{(k)}(\bullet)$ is a probability density function obtained using a Gaussian kernel density estimate from a sequence $s^{*b}_{(k)}$, $1 \leq b \leq B$, M is a total number of samples drawn from a prior probability distribution representing prior knowledge of a likelihood of the revenue per user session, m is an index value for different samples drawn from the prior probability distribution, $\hat{\theta}_m$ is a $m^{th}$ sample drawn from the prior probability distribution, and $\hat{\theta}_o$ is a baseline value for the revenue per user session of the plurality of previous user sessions, and $\sigma(\hat{\theta}_{(k)}) = \sqrt{\sigma^2(T(\hat{F}(y_{(k)}))) + \sigma^2(T(\hat{F}(x_{(k)})))}$; and determining the query response to the online search query further comprises rejecting a null hypothesis, the null hypothesis $\theta = \theta_0$ if $L_n > 1/\alpha$ for some $n > 1$, where $\theta$ is the revenue per user session of the plurality of previous user sessions and $\alpha$ is a type 1 error threshold.

8. A method, comprising:

receiving an online search query entered into a search field of an online ecommerce website by a user using the online ecommerce website;

determining a query response to the online search query with a combination of a nonparametric bootstrap distribution and a mixture sequential probability ratio test (SPRT), the query response comprising one or more products and being based on one of:
(1) a first metric comprising a query success rate per user session of a plurality of previous user sessions, or
(2) a second metric comprising a revenue per user session of the plurality of previous user sessions, wherein the first metric comprises a ratio of a total number of successful queries per user session of the plurality of previous user sessions to a total number of queries per user session of the plurality of previous user sessions; and coordinating a display of the query response to the user using the online ecommerce website, wherein:
determining the query response to the online search query further comprises:
dividing data from the plurality of previous user sessions into a plurality of blocks of data; and
determining studentized plug-in statistics for the query success rate per user session of the plurality of previous user sessions on each block of data of the plurality of blocks of data.

9. The method of claim 8, wherein the query response to the online search query is based on the first metric, and wherein determining the query response to the online search query further comprises:

estimating a query success likelihood ratio of the studentized plug-in statistics for each block of data of the plurality of blocks of data using the nonparametric bootstrap distribution; and performing the mixture SPRT using the query success likelihood ratio of the studentized plug-in statistics for each block of data of the plurality of blocks of data by treating each block of data of the plurality of blocks of data as a unit observation.

10. The method of claim 9, wherein:

dividing the data from the plurality of previous user sessions comprises:
drawing a first random sample of size N from the plurality of blocks of data with a replacement from $x_{(k)}$, where k is an index value for each block of data of the plurality of blocks of data, and $x_{(k)}$ is a $k^{th}$ block of data of size N of the plurality of blocks of data;
denoting the first random sample by $x^*_{(k)}$; and
repeating (1) drawing additional random samples of size N from the plurality of blocks of data and (2) denoting the additional random samples B times to obtain a sequence $x^{*b}_{(k)}$, $1 \leq b \leq B$, where b is an index value for the first random sample and the additional random samples, and $x^{*b}_{(k)}$ is a $b^{th}$ bootstrap sample of size N obtained by sampling with replacement on the $k^{th}$ block of data $x_{(k)}$;

determining the studentized plug-in statistics for the query success rate per user session of the plurality of previous user sessions on each block of data of the plurality of blocks of data comprises:

determining, for each b, the studentized plug-in statistics $S^{*b}_{(k)}$ as:

$$s^{*b}_{(k)} = \frac{T(\hat{F}(x^{*b}_{(k)})) - \hat{\theta}_{(k)}}{\sigma(T(\hat{F}(x^{*b}_{(k)})))},$$

where $(T(\hat{F}(x^{*b}_{(k)})))$ is a plug-in estimate of the query success rate per user session of the plurality of previous user sessions determined from $x^{*b}_{(k)}$, $\hat{\theta}_{(k)}$ is a plug-in estimate of the query success rate per user session of the plurality of previous user sessions determined from the $k^{th}$ block of data $x_{(k)}$, and σ is a standard deviation of $(T(\hat{F}(x^{*b}_{(k)})))$;

performing the mixture SPRT using the query success likelihood ratio of the studentized plug-in statistics for each block of data of the plurality of blocks of data by treating each block of data of the plurality of blocks of data as the unit observation comprises:

determining a likelihood ratio score $L_n$ determined as a number n of blocks of data of the plurality of blocks of data as:

$$L_n = \sum_{m=1}^{M} \left( \frac{\prod_{k=1}^{n} g^*_{(k)}\left(\frac{\hat{\theta}_{(k)} - \tilde{\theta}_m}{\sigma(\hat{\theta}_{(k)})}\right)}{\prod_{k=1}^{n} g^*_{(k)}\left(\frac{\hat{\theta}_{(k)} - \tilde{\theta}_o}{\sigma(\hat{\theta}_{(k)})}\right)} \right),$$

where $g^*_{(k)}(\cdot)$ is a probability density function obtained using a Gaussian kernel density estimate from a sequence $s^{*b}_{(k)}$, $1 \leq b \leq B$, M is a total number of samples drawn from a prior probability distribution representing prior knowledge of a likelihood of the query success rate per user session, m is an index value for different samples drawn from the prior probability distribution, $\tilde{\theta}_m$ is a $m^{th}$ sample drawn from the prior probability distribution, and $\tilde{\theta}_o$ is a baseline value for the query success rate per user session of the plurality of previous user sessions; and determining the query response to the online search query further comprises rejecting a null hypothesis $\theta = \theta_0$ if $L_n > 1/\alpha$ for some n>1, where θ is the query success rate per user session of the plurality of previous user sessions and α is a type 1 error threshold.

11. The method of claim 9, wherein:

the method further comprises performing an A/B test on the first metric;

dividing the data from the plurality of previous user sessions comprises:

drawing a first random sample of size N from a control group A of the plurality of blocks of data with a replacement from $x_{(k)}$, where k is an index value for each block of data of the plurality of blocks of data, and $x_{(k)}$ is a $k^{th}$ block of data of size N from the control group A of the plurality of blocks of data;

denoting the first random sample by $x^*_{(k)}$;

repeating (1) drawing additional first random samples of size N from the control group A of plurality of blocks of data and (2) denoting the additional first random samples B times to obtain a sequence $x^{*b}_{(k)}$, $1 \leq b \leq B$, where b is an index value for the first random sample and the additional first random samples, and $x^{*b}_{(k)}$ is a $b^{th}$ bootstrap sample of size N obtained by sampling with replacement on the $k^{th}$ block of data $x_{(k)}$;

drawing a second random sample of size N from a variable group B of the plurality of blocks of data with a replacement from $y_{(k)}$, where k is an index value for each block of data of the plurality of blocks of data, and $y_{(k)}$ is a $k^{th}$ block of data of size N from the variable group B of the plurality of blocks of data;

denoting the second random sample by $y^*_{(k)}$; and repeating (1) drawing additional second random samples of size N from the variable group B of the plurality of blocks of data and (2) denoting the additional second random samples B times to obtain a sequence $y^{*b}_{(k)}$, $1 \leq b \leq B$, where b is an index value for the first random sample and the additional random samples, and $y^{*b}_{(k)}$ is a $b^{th}$ bootstrap sample of size N obtained by sampling with replacement on the $k^{th}$ block of data $y_{(k)}$;

determining the studentized plug-in statistics for the query success rate per user session of the plurality of previous user sessions on each block of data of the plurality of blocks of data comprises:

determining, for each b, the studentized plug-in statistics $s^{*b}_{(k)}$ as:

$$s^{*b}_{(k)} = \frac{T(\hat{F}(y^{*b}_{(k)})) - T(\hat{F}(x^{*b}_{(k)})) - \hat{\theta}_{(k)}}{\sqrt{\sigma^2(T(\hat{F}(x^{*b}_{(k)}))) + \sigma^2(T(\hat{F}(x^{*b}_{(k)})))}},$$

where $(T(\hat{F}(y^{*b}_{(k)})))$ is a plug-in estimate of the query success rate per user session of the plurality of previous user sessions of the variable group B determined from $y^{*b}_{(k)}$, $y^{*b}_{(k)}$ is a $b^{th}$ bootstrap sample of size N obtained by sampling with replacement on the $k^{th}$ block of data $y_{(k)}$, $(T(\hat{F}(x^{*b}_{(k)})))$ is a plug-in estimate of the query success rate per user session of the plurality of previous user sessions of the control group A determined from $x^{*b}_{(k)}$, $\hat{\theta}_{(k)}$ is $T(\hat{F}(y_{(k)})) - T(\hat{F}(x_{(k)}))$, $T(\hat{F}(y))$ is a plug-in estimate of the query success rate per user session of the plurality of previous user sessions determined from the variable group B, $T(\hat{F}(x_{(k)}))$ is a plug-in estimate of the query success rate per user session of the plurality of previous user sessions determined from the control group A, and σ is a standard deviation;

performing the mixture SPRT using the query success likelihood ratio of the studentized plug-in statistics for each block of data of the plurality of blocks of data by treating each block of data of the plurality of blocks of data as the unit observation comprises:

determining a likelihood ratio score $L_n$ determined as a number n of blocks of data of the plurality of blocks of data as:

$$L_n = \sum_{m=1}^{M} \left( \frac{\prod_{k=1}^{n} g_{(k)}^* \left( \frac{\hat{\theta}_{(k)} - \tilde{\theta}_m}{\sigma(\hat{\theta}_{(k)})} \right)}{\prod_{k=1}^{n} g_{(k)}^* \left( \frac{\hat{\theta}_{(k)} - \tilde{\theta}_o}{\sigma(\hat{\theta}_{(k)})} \right)} \right),$$

where $g_{(k)}^*(\cdot)$ is a probability density function obtained using a Gaussian kernel density estimate from a sequence $s_{(k)}^{*b}$, $1 \leq b \leq B$, M is a total number of samples drawn from a prior probability distribution representing prior knowledge of a likelihood of the query success rate, m is an index value for different samples drawn from the prior probability distribution, $\tilde{\theta}_m$ is a $m^{th}$ sample drawn from the prior probability distribution, and $\tilde{\theta}_o$ is a baseline value for the query success rate per user session of the plurality of previous user sessions, and $\sigma(\hat{\theta}_{(k)}) = \sqrt{\sigma^2(T(\hat{F}(y_{(k)}))) + \sigma^2(T(\hat{F}(x_{(k)})))}$; and determining the query response to the online search query further comprises rejecting a null hypothesis, the null hypothesis $\theta = \theta_0$ if $L_n > 1/\alpha$ for some $n > 1$, where $\theta$ is the query success rate per user session of the plurality of previous user sessions and $\alpha$ is a type 1 error threshold.

12. The method of claim 8, wherein the query response to the online search query is based on the second metric, and wherein determining the query response to the online search query further comprises:

estimating a revenue likelihood ratio of the studentized plug-in statistics for each block of data of the plurality of blocks of data using the nonparametric bootstrap distribution; and performing the mixture SPRT using the revenue likelihood ratio of the studentized plug-in statistics for each block of data of the plurality of blocks of data by treating each block of data of the plurality of blocks of data as a unit observation.

13. The method of claim 12, wherein:

dividing the data from the plurality of previous user sessions into the plurality of blocks of data comprises:

drawing a first random sample of size N from the plurality of blocks of data with a replacement from $x_{(k)}$, where k is an index value for each block of data of the plurality of blocks of data, and $x_{(k)}$ is a $k^{th}$ block of data of size N of the plurality of blocks of data;

denoting the first random sample by $x_{(k)}^*$; and repeating (1) drawing additional random samples of size N from the plurality of blocks of data and (2) denoting the additional random samples B times to obtain a sequence $x_{(k)}^{*b}$, $1 \leq b \leq B$, where b is an index value for the first random sample and the additional random samples, and $x_{(k)}^{*b}$ is a $b^{th}$ bootstrap sample of size N obtained by sampling with replacement on the $k^{th}$ block of data $x_{(k)}$;

determining the studentized plug-in statistics for the revenue per user session of the plurality of previous user sessions on each block of data of the plurality of blocks of data comprises:

determining, for each b, the studentized plug-in statistics $s_{(k)}^{*b}$ as:

$$s_{(k)}^{*b} = \frac{T(\hat{F}(x_{(k)}^{*b})) - \hat{\theta}_{(k)}}{\sigma(T(\hat{F}(x_{(k)}^{*b})))},$$

where $(T(\hat{F}(x_{(k)}^{*b})))$ is a plug-in estimate of the revenue per user session of the plurality of previous user sessions determined from $x_{(k)}^{*b}$, $\hat{\theta}_{(k)}$ is a plug-in estimate of the revenue per user session of the plurality of previous user sessions determined from the $k^{th}$ block of data $x_{(k)}$, and $\sigma$ is a standard deviation of $(T(\hat{F}(x_{(k)}^{*b})))$;

performing the mixture SPRT using the revenue likelihood ratio of the studentized plug-in statistics for each block of data of the plurality of blocks of data by treating each block of data of the plurality of blocks of data as the unit observation comprises:

determining a likelihood ratio score $L_n$ determined as a number n of blocks of data of the plurality of blocks of data as:

$$L_n = \sum_{m=1}^{M} \left( \frac{\prod_{k=1}^{n} g_{(k)}^* \left( \frac{\hat{\theta}_{(k)} - \tilde{\theta}_m}{\sigma(\hat{\theta}_{(k)})} \right)}{\prod_{k=1}^{n} g_{(k)}^* \left( \frac{\hat{\theta}_{(k)} - \tilde{\theta}_o}{\sigma(\hat{\theta}_{(k)})} \right)} \right),$$

where $g_{(k)}^*(\cdot)$ is a probability density function obtained using a Gaussian kernel density estimate from a sequence $s_{(k)}^{*b}$, $1 \leq b \leq B$, M is a total number of samples drawn from a prior probability distribution representing prior knowledge of a likelihood of the revenue per user session of the plurality of previous user sessions, m is an index value for different samples drawn from the prior probability distribution, $\tilde{\theta}_m$ is a $m^{th}$ sample drawn from the prior probability distribution, and $\tilde{\theta}_o$ is a baseline value for the revenue per user session of the plurality of previous user sessions; and determining the query response to the online search query further comprises rejecting a null hypothesis $\theta = \theta_0$ if $L_n > 1/\alpha$ for some $n > 1$, where $\theta$ is the revenue per user session of the plurality of previous user sessions and $\alpha$ is a type 1 error threshold.

14. The method of claim 12, wherein:

the method further comprises performing an A/B test on the second metric;

dividing the data from the plurality of previous user sessions comprises:

drawing a first random sample of size N from a control group A of the plurality of blocks of data with a replacement from $x_{(k)}$, where k is an index value for each block of data of the plurality of blocks of data, and $x_{(k)}$ is a $k^{th}$ block of data of size N from the control group A of the plurality of blocks of data;

denoting the first random sample by $x_{(k)}^*$;

repeating (1) drawing additional first random samples of size N from the control group A of plurality of blocks of data and (2) denoting the additional first random samples B times to obtain a sequence $x_{(k)}^{*b}$, $1 \leq b \leq B$, where b is an index value for the first random sample and the additional first random samples, and $x^*_{(k)}{}^b$ is a $b^{th}$ bootstrap sample of size N obtained by sampling with replacement on the $k^{th}$ block of data $x_{(k)}$;

drawing a second random sample of size N from a variable group B of the plurality of blocks of data with a replacement from $y_{(k)}$, where k is an index value for each block of data of the plurality of blocks of data, and $y_{(k)}$ is a $k^{th}$ block of data of size N from the variable group B of the plurality of blocks of data;

denoting the second random sample by $y^*_{(k)}$; and repeating (1) drawing additional second random samples of size N from the variable group B of the plurality of blocks of data and (2) denoting the additional second random samples B times to obtain a sequence $y^*_{(k)}{}^b$, $1 \leq b \leq B$, where b is an index value for the first random sample and the additional random samples, and $y^*_{(k)}{}^b$ is a $b^{th}$ bootstrap sample of size N obtained by sampling with replacement on the $k^{th}$ block of data $y_{(k)}$;

determining the studentized plug-in statistics for the revenue per user session of the plurality of previous user sessions on each block of data of the plurality of blocks of data comprises:

determining, for each b, the studentized plug-in statistics $s^*_{(k)}{}^b$ as:

$$s^{*b}_{(k)} = \frac{T(\hat{F}(y^{*b}_{(k)})) - T(\hat{F}(x^{*b}_{(k)})) - \hat{\theta}_{(k)}}{\sqrt{\sigma^2(T(\hat{F}(x^{*b}_{(k)}))) + \sigma^2(T(\hat{F}(x^{*b}_{(k)})))}},$$

where $(T(\hat{F}(y^*_{(k)}{}^b)))$ is a plug-in estimate of the revenue per user session of the plurality of previous user sessions of the variable group B determined from $y^*_{(k)}{}^b$, $y^*_{(k)}{}^b$ is a $b^{th}$ bootstrap sample of size N obtained by sampling with replacement on the $k^{th}$ block of data $y_{(k)}$, $(T(\hat{F}(x^*_{(k)}{}^b)))$ is a plug-in estimate of the revenue per user session of the plurality of previous user sessions of the control group A determined from $x^*_{(k)}{}^b$, $\hat{\theta}_{(k)}$ is $T(\hat{F}(y^k)) - T(\hat{F}(x^k))$, $T(\hat{F}(y_{(k)}))$ is a plug-in estimate of the revenue per user session of the plurality of previous user sessions determined from the variable group B, $T(\hat{F}(x_{(k)}))$ is a plug-in estimate of the revenue per user session of the plurality of previous user sessions determined from the control group A, and $\sigma$ is a standard deviation;

performing the mixture SPRT using the revenue likelihood ratio of the studentized plug-in statistics for each block of data of the plurality of blocks of data by treating each block of data of the plurality of blocks of data as the unit observation comprises:

determining a likelihood ratio score $L_n$ determined as a number n of blocks of data of the plurality of blocks of data as:

$$L_n = \sum_{m=1}^{M} \left( \frac{\prod_{k=1}^{n} g^*_{(k)}\left(\frac{\hat{\theta}_{(k)} - \tilde{\theta}_m}{\sigma(\hat{\theta}_{(k)})}\right)}{\prod_{k=1}^{n} g^*_{(k)}\left(\frac{\hat{\theta}_{(k)} - \tilde{\theta}_o}{\sigma(\hat{\theta}_{(k)})}\right)} \right),$$

where $g^*_{(k)}(\cdot)$ is a probability density function obtained using a Gaussian kernel density estimate from a sequence $s^*_{(k)}{}^b$, $1 \leq b \leq B$, M is a total number of samples drawn from a prior probability distribution representing prior knowledge of a likelihood of the revenue per user session, m is an index value for different samples drawn from the prior probability distribution, $\tilde{\theta}_m$ is a $m^{th}$ sample drawn from the prior probability distribution, and $\tilde{\theta}_o$ is a baseline value for the revenue per user session of the plurality of previous user sessions, and $\sigma(\hat{\theta}_{(k)}) = \sqrt{\sigma^2(T(\hat{F}(y_{(k)}))) + \sigma^2(T(\hat{F}(x_{(k)})))}$; and determining the query response to the online search query further comprises rejecting a null hypothesis, the null hypothesis $\theta = \theta_0$ if $L_n > 1/\alpha$ for some $n > 1$, where $\theta$ is the revenue per user session of the plurality of previous user sessions and $\alpha$ is a type 1 error threshold.

15. A system comprising:

one or more processing modules; and one or more non-transitory storage modules storing computing instructions configured to run on the one or more processing modules and perform acts of:

preventing type 1 error inflation under continuous monitoring of a parameter of interest on an online website by:

dividing data from the parameter of interest gathered from the online website into a plurality of blocks of data;

determining studentized plug-in statistics for the parameter of interest on each block of data of the plurality of blocks of data;

estimating a parameter of interest likelihood ratio of the studentized plug-in statistics for each block of data of the plurality of blocks of data using a nonparametric bootstrap distribution; and performing a mixture sequential probability ratio test (SPRT) using the parameter of interest likelihood ratio of the studentized plug-in statistics for each block of data of the plurality of blocks of data by treating each block of data of the plurality of blocks of data as a unit observation; and altering a display of the online website based upon results of the mixture SPRT to prevent the type 1 error inflation.

16. The system of claim 15, wherein:

dividing the data from the parameter of interest comprises:

drawing a first random sample of size N from the plurality of blocks of data with a replacement from $x_{(k)}$, where k is an index value for each block of data of the plurality of blocks of data, and $x_{(k)}$ is a $k^{th}$ block of data of size N of the plurality of blocks of data;

denoting the first random sample by $x^*_{(k)}$; and repeating (1) drawing additional random samples of size N from the plurality of blocks of data and (2) denoting the additional random samples B times to obtain a sequence $x^*_{(k)}{}^b$, $1 \leq b \leq B$, where b is an index value for the first random sample and the additional random samples, and $x^*_{(k)}{}^b$ is a $b^{th}$ bootstrap sample of size N obtained by sampling with replacement on the $k^{th}$ block of data $x_{(k)}$;

determining the studentized plug-in statistics for the parameter of interest on each block of data of the plurality of blocks of data comprises:

determining, for each b, the studentized plug-in statistics $s^{*b}_{(k)}$ as:

$$s^{*b}_{(k)} = \frac{T(\hat{F}(x^{*b}_{(k)})) - \hat{\theta}_{(k)}}{\sigma(T(\hat{F}(x^{*b}_{(k)})))},$$

where $(T(\hat{F}(x^{*}_{(k)}{}^{b})))$ is a plug-in estimate of the parameter of interest determined from $x^{*}_{(k)}{}^{b}$, $\hat{\theta}_{(k)}$ is a plug-in estimate of the parameter of interest determined from the $k^{th}$ block of data $x_{(k)}$; and $\sigma$ is a standard deviation of $(T(\hat{F}(x^{*}_{(k)}{}^{b})))$;

performing the mixture SPRT using the parameter of interest likelihood ratio of the studentized plug-in statistics for each block of data of the plurality of blocks of data by treating each block of data of the plurality of blocks of data as the unit observation comprises:

determining a likelihood ratio score $L_n$ determined as a number n of blocks of data of the plurality of blocks of data as:

$$L_n = \sum_{m=1}^{M} \left( \frac{\prod_{k=1}^{n} g^*_{(k)}\left(\frac{\hat{\theta}_{(k)} - \tilde{\theta}_m}{\sigma(\hat{\theta}_{(k)})}\right)}{\prod_{k=1}^{n} g^*_{(k)}\left(\frac{\hat{\theta}_{(k)} - \tilde{\theta}_o}{\sigma(\hat{\theta}_{(k)})}\right)} \right),$$

where $g^*_{(k)}(\bullet)$ is a probability density function obtained using a Gaussian kernel density estimate from a sequence $s^{*}_{(k)}{}^{b}$, $1 \le b \le B$, M is a total number of samples drawn from a prior probability distribution representing prior knowledge of a likelihood of the parameter of interest, m is an index value for different samples drawn from the prior probability distribution, $\tilde{\theta}_m$ is a $m^{th}$ sample drawn from the prior probability distribution, and $\tilde{\theta}_o$ is a baseline value for the parameter of interest; and the one or more non-transitory storage modules storing the computing instructions configured to run on the one or more processing modules and further perform anact of preventing the type 1 error inflation under continuous monitoring of the parameter of interest by rejecting a null hypothesis $\theta = \theta_0$ if $L_n > 1/\alpha$ for some $n > 1$, where $\theta$ is the parameter of interest and $\alpha$ is a type 1 error threshold.

17. The system of claim 16, wherein the parameter of interest comprises one or more of:
a plurality of visual presentations of an ecommerce website;
a query response to an online search query, the query response comprising one or more products;
a plurality of organizational features of an ecommerce website;
functioning of a plurality of modules in a software system; and
functioning of software.

18. A method comprising:
preventing type 1 error inflation under continuous monitoring of a parameter of interest on an online website by:

dividing data from the parameter of interest gathered from the online website into a plurality of blocks of data;

determining studentized plug-in statistics for the parameter of interest on each block of data of the plurality of blocks of data;

estimating a parameter of interest likelihood ratio of the studentized plug-in statistics for each block of data of the plurality of blocks of data using a nonparametric bootstrap distribution; and performing a mixture sequential probability ratio test (SPRT) using the parameter of interest likelihood ratio of the studentized plug-in statistics for each block of data of the plurality of blocks of data by treating each block of data of the plurality of blocks of data as a unit observation; and altering a display of the online website based upon results of the mixture SPRT to prevent the type 1 error inflation.

19. The method of claim 18, wherein:
dividing the data from the parameter of interest comprises:
drawing a first random sample of size N from the plurality of blocks of data with a replacement from $x_{(k)}$, where k is an index value for each block of data of the plurality of blocks of data, and $x_{(k)}$ is a $k^{th}$ block of data of size N of the plurality of blocks of data;
denoting the first random sample by $x^*_{(k)}$; and
repeating (1) drawing additional random samples of size N from the plurality of blocks of data and (2) denoting the additional random samples B times to obtain a sequence $x^{*}_{(k)}{}^{b}$, $1 \le b \le B$, where b is an index value for the first random sample and the additional random samples, and $x^{*}_{(k)}{}^{b}$ is a $b^{th}$ bootstrap sample of size N obtained by sampling with replacement on the $k^{th}$ block of data $x_{(k)}$;
determining the studentized plug-in statistics for the parameter of interest on each block of data of the plurality of blocks of data comprises:
determining, for each b, the studentized plug-in statistics $s^{*b}_{(k)}$ as:

$$s^{*b}_{(k)} = \frac{T(\hat{F}(x^{*b}_{(k)})) - \hat{\theta}_{(k)}}{\sigma(T(\hat{F}(x^{*b}_{(k)})))},$$

where $(T(\hat{F}(x^{**}_{(k)}{}^{b})))$ is a plug-in estimate of the parameter of interest determined from $x^{*}_{(k)}{}^{b}$, $\hat{\theta}_{(k)}$ is a plug-in estimate of the parameter of interest determined from the $k^{th}$ block of data $x_{(k)}$; and $\sigma$ is a standard deviation of $(T(\hat{F}(x^{*}_{(k)}{}^{b})))$;

performing the mixture SPRT using the parameter of interest likelihood ratio of the studentized plug-in statistics for each block of data of the plurality of blocks of data by treating each block of data of the plurality of blocks of data as the unit observation comprises:

determining a likelihood ratio score $L_n$ determined as a number n of blocks of data of the plurality of blocks of data as:

$$L_n = \sum_{m=1}^{M} \left( \frac{\prod_{k=1}^{n} g^*_{(k)}\left(\frac{\hat{\theta}_{(k)} - \tilde{\theta}_m}{\sigma(\hat{\theta}_{(k)})}\right)}{\prod_{k=1}^{n} g^*_{(k)}\left(\frac{\hat{\theta}_{(k)} - \tilde{\theta}_o}{\sigma(\hat{\theta}_{(k)})}\right)} \right),$$

where $g^*_{(k)}(\cdot)$ is a probability density function obtained using a Gaussian kernel density estimate from a sequence $s^{*b}_{(k)}$, $1 \leq b \leq B$, M is a total number of samples drawn from a prior probability distribution representing prior knowledge of a likelihood of the parameter of interest, m is an index value for different samples drawn from the prior probability distribution, $\tilde{\theta}_m$ is a $m^{th}$ sample drawn from the prior probability distribution, and $\tilde{\theta}_o$ is a baseline value for the parameter of interest; and preventing the type 1 error inflation under continuous monitoring of the parameter of interest by rejecting a null hypothesis $\theta = \theta$ if $L_n > 1/\alpha$ for some $n > 1$, where $\theta$ is the parameter of interest and $\alpha$ is a type 1 error threshold.

20. The method of claim 19, wherein the parameter of interest comprises one or more of:

a plurality of visual presentations of an ecommerce website;

a query response to an online search query, the query response comprising one or more products;

a plurality of organizational features of an ecommerce website;

functioning of a plurality of modules in a software system; and functioning of software.

\* \* \* \* \*